United States Patent
Kim et al.

(10) Patent No.: US 11,985,374 B2
(45) Date of Patent: May 14, 2024

(54) METHOD OF CONTROLLING THE SHARING OF VIDEOS AND ELECTRONIC DEVICE ADAPTED THERETO

(71) Applicant: Samsung Electronics Co., Ltd., Gyeonggi-do (KR)

(72) Inventors: Taehyung Kim, Gyeonggi-do (KR); Sanghun Lee, Gyeongsangbuk-do (KR); Seula Lee, Gyeonggi-do (KR); Younglok Lee, Busan (KR); Hyunkyoung Kim, Seoul (KR); Sungho Park, Seoul (KR); Woonghee Park, Gyeonggi-do (KR); Yeonhwa Oh, Seoul (KR); Yun Jegal, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/021,565

(22) Filed: Sep. 15, 2020

(65) Prior Publication Data
US 2020/0413120 A1    Dec. 31, 2020

Related U.S. Application Data

(63) Continuation of application No. 15/435,998, filed on Feb. 17, 2017, now abandoned.

(30) Foreign Application Priority Data

Feb. 17, 2016   (KR) .......................... 10-2016-0018627

(51) Int. Cl.
*G06F 3/14*      (2006.01)
*G06F 3/04817*   (2022.01)
(Continued)

(52) U.S. Cl.
CPC ... *H04N 21/42204* (2013.01); *G06F 3/04817* (2013.01); *G06F 3/04842* (2013.01);
(Continued)

(58) Field of Classification Search
CPC ............... H04N 1/00137; H04N 7/147; H04N 1/00411; H04N 21/43622; H04N 7/148;
(Continued)

(56) References Cited

U.S. PATENT DOCUMENTS 8,259,157 B2   9/2012   Yanagisawa
8,565,819 B2   10/2013  Zhang et al.
(Continued)

FOREIGN PATENT DOCUMENTS

CN   101651760   2/2010
CN   101998106   3/2011
(Continued)

OTHER PUBLICATIONS

International Search Report dated May 23, 2017 issued in counterpart application No. PCT/KR2017/001815, 3 pages.
(Continued)

*Primary Examiner* — Dismery Mercedes
(74) *Attorney, Agent, or Firm* — The Farrell Law Firm, P.C.

(57) ABSTRACT

A method of an electronic device for controlling sharing of video and an electronic device adapted to the method are provided. The electronic device includes a display, a communication circuit, a control circuit, and a memory electrically connected to the control circuit, where the memory stores instructions enabling the control circuit to control the communication circuit to transmit a first video to an external device connected to the electronic device, when a video sharing function is executed, display an icon on the display, when transmitting the first video, and control the commu-
(Continued)

nication circuit to pause the transmission of the first video and to transmit a second video to the external device, in response to a first input applied to the icon.

15 Claims, 17 Drawing Sheets

(51) Int. Cl.
| | |
|---|---|
| *G06F 3/04842* | (2022.01) |
| *H04M 1/72412* | (2021.01) |
| *H04N 7/00* | (2011.01) |
| *H04N 21/422* | (2011.01) |
| *H04N 21/433* | (2011.01) |
| *H04N 21/4363* | (2011.01) |
| *H04N 21/472* | (2011.01) |
| *H04N 21/81* | (2011.01) |
| *H04N 21/436* | (2011.01) |

(52) U.S. Cl.
CPC ...... *G06F 3/1454* (2013.01); *H04M 1/72412* (2021.01); *H04N 7/00* (2013.01); *H04N 21/4333* (2013.01); *H04N 21/43637* (2013.01); *H04N 21/472* (2013.01); *H04N 21/47217* (2013.01); *H04N 21/8153* (2013.01); *G09G 2370/16* (2013.01); *H04N 21/4222* (2013.01); *H04N 21/43615* (2013.01)

(58) Field of Classification Search
CPC ......... H04N 21/4788; H04N 21/42204; H04N 21/4333; H04N 21/4363; H04N 21/43637; H04N 21/43615; H04L 67/1095; H04L 67/06; H04L 12/1818; H04L 67/10; H04L 51/04; G06F 3/1454; G06F 3/04842; G06F 21/35; G06F 9/451; G06F 3/048; G06F 3/1423; G06F 21/84; G06F 3/04817; G09G 2370/16; G09G 2354/00
See application file for complete search history.

(56) References Cited

U.S. PATENT DOCUMENTS

| | | | |
|---|---|---|---|
| 8,896,765 B1 | 11/2014 | White et al. | |
| 9,419,923 B2 | 8/2016 | Seo et al. | |
| 9,454,251 B1 | 9/2016 | Guihot | |
| 9,760,331 B2 | 9/2017 | Lee et al. | |
| 9,955,418 B2* | 4/2018 | Koroku | H04W 4/80 |
| 10,082,998 B2 | 9/2018 | Chu | |
| 10,802,708 B2* | 10/2020 | Lee | H04M 1/72436 |
| 10,983,749 B2* | 4/2021 | Kim | G06F 3/0484 |
| 2006/0031779 A1 | 2/2006 | Theurer | |
| 2006/0258289 A1 | 11/2006 | Dua | |
| 2008/0276272 A1 | 11/2008 | Rajaraman et al. | |
| 2009/0047000 A1 | 2/2009 | Walikis | |
| 2009/0061841 A1 | 3/2009 | Chaudhri | |
| 2009/0066425 A1 | 3/2009 | Seo et al. | |
| 2009/0081950 A1* | 3/2009 | Matsubara | H04N 21/43637 455/3.06 |
| 2009/0117890 A1 | 5/2009 | Jacobsen et al. | |
| 2011/0047485 A1 | 2/2011 | Takakura | |
| 2011/0117941 A1 | 5/2011 | Zhang | |
| 2011/0199318 A1 | 8/2011 | Fong et al. | |
| 2011/0249078 A1 | 10/2011 | Abuan et al. | |
| 2011/0283334 A1* | 11/2011 | Choi | H04L 67/148 725/148 |
| 2012/0040720 A1* | 2/2012 | Zhang | G06F 3/1454 455/557 |
| 2012/0069132 A1 | 3/2012 | Kato | |
| 2013/0021531 A1 | 1/2013 | Eguchi et al. | |
| 2013/0081089 A1* | 3/2013 | Kim | H04N 21/4122 725/61 |
| 2013/0086615 A1 | 4/2013 | Williams | |
| 2013/0154978 A1 | 6/2013 | Kim et al. | |
| 2013/0219072 A1 | 8/2013 | Han et al. | |
| 2013/0242033 A1 | 9/2013 | Kato et al. | |
| 2014/0009394 A1 | 1/2014 | Lee | |
| 2014/0025847 A1 | 1/2014 | Choi | |
| 2014/0178028 A1 | 6/2014 | Park | |
| 2014/0215356 A1* | 7/2014 | Brander | G06F 21/84 715/753 |
| 2014/0240440 A1* | 8/2014 | Seo | H04L 51/04 715/753 |
| 2014/0289669 A1 | 9/2014 | Wang | |
| 2014/0359465 A1 | 12/2014 | Litan Sever et al. | |
| 2015/0061970 A1 | 3/2015 | Kim et al. | |
| 2015/0074570 A1 | 3/2015 | Takmoto et al. | |
| 2015/0089418 A1 | 3/2015 | Tan | |
| 2015/0113432 A1* | 4/2015 | Jung | G06F 3/04842 715/748 |
| 2015/0208217 A1 | 7/2015 | Hong et al. | |
| 2015/0249698 A1 | 9/2015 | Vedula et al. | |
| 2015/0281769 A1 | 10/2015 | Chiu | |
| 2015/0326630 A1 | 11/2015 | Kim | |
| 2016/0021338 A1* | 1/2016 | Hsieh | H04M 3/567 348/14.03 |
| 2016/0037565 A1* | 2/2016 | Choi | H04W 76/10 370/329 |
| 2016/0191621 A1* | 6/2016 | Oh | H04L 67/1095 709/205 |
| 2016/0210016 A1 | 7/2016 | Shin | |
| 2016/0216852 A1 | 7/2016 | Lee | |
| 2016/0239250 A1 | 8/2016 | Kim et al. | |
| 2016/0253142 A1* | 9/2016 | Choi | G06F 3/1423 345/1.3 |
| 2017/0134605 A1 | 5/2017 | Ju | |
| 2017/0193211 A1 | 7/2017 | Blake | |
| 2017/0324794 A1 | 11/2017 | Jeong | |
| 2018/0024805 A1* | 1/2018 | Nakagawa | G06F 21/84 709/203 |
| 2019/0342241 A1 | 11/2019 | Joyce et al. | |

FOREIGN PATENT DOCUMENTS

| | | |
|---|---|---|
| CN | 102135886 | 7/2011 |
| CN | 102215372 | 10/2011 |
| CN | 102244676 | 11/2011 |
| CN | 103155692 | 6/2013 |
| CN | 103347041 | 10/2013 |
| CN | 104423806 | 3/2015 |
| CN | 105278950 | 1/2016 |
| EP | 2 605 611 | 6/2013 |
| EP | 2 760 177 | 7/2014 |
| EP | 2 813 981 | 12/2014 |
| JP | 2009-080593 | 4/2009 |
| KR | 10-1218293 | 1/2013 |
| KR | 1020130033044 | 4/2013 |
| KR | 1020130070090 | 6/2013 |
| KR | 1020130095519 | 8/2013 |
| KR | 102013116976 | 10/2013 |
| KR | 1020140029506 | 3/2014 |
| KR | 1020150090103 | 1/2015 |
| KR | 1020150025584 | 3/2015 |
| KR | 1020150047006 | 5/2015 |
| KR | 1020150087085 | 7/2015 |
| KR | 1020150095124 | 8/2015 |
| KR | 1020150134906 | 12/2015 |
| KR | 1020160105242 | 9/2016 |
| WO | WO 2013/180318 | 12/2013 |
| WO | WO 2015/130148 | 9/2015 |
| WO | WO 2016/007374 | 1/2016 |

OTHER PUBLICATIONS

EP Summons to Attend Oral Proceedings dated Apr. 8, 2020 issued in counterpart application No. 17753534.1-1209, 9 pages.

(56) References Cited

OTHER PUBLICATIONS

Chinese Office Action dated Aug. 5, 2020 issued in counterpart application No. 201780002440.2, 23 pages.
EP Provisional Opinion dated Nov. 6, 2020 issued in counterpart applicaiton No. 17753534.1-1209, 5 pages.
Korean Office Action dated Apr. 1, 2022 issued in counterpart application No. 10-2016-0018627, 4 pages.
European Search Report dated Jun. 3, 2022 Issued in counterpart application No. 21184203.4-1208, 10 pages.
Chinese Office Action dated Jan. 3, 2023 issued in counterpart application No. 202110690294.5, 20 pages.
Chinese Office Action dated Jun. 29, 2023 issued in counterpart application No. 202110690294.5, 20 pages.
Chinese Office Action dated Dec. 25, 2023 issued in counterpart application No. 202110690294.5, 10 pages.
European Search Report dated Jan. 22, 2024 issued in counterpart application No. 23209669.3-1208, 11 pages.
Indian Notice of Hearing dated Dec. 22, 2023 issued in counterpart application No. 201817024906, 3 pages.

* cited by examiner

METHOD OF CONTROLLING THE SHARING OF VIDEOS AND ELECTRONIC DEVICE ADAPTED THERETO

PRIORITY

This application is a Continuation Application of U.S. application Ser. No. 15/435,998, filed in the U.S. Patent and Trademark Office on Feb. 17, 2017, which claims priority under 35 U.S.C. § 119(a) to a Korean Patent Application filed on Feb. 17, 2016, in the Korean Intellectual Property Office and assigned Serial No. 10-2016-0018627, the entire disclosure of which is incorporated herein by reference.

BACKGROUND

1. Field of the Invention

The present disclosure relates generally to electronic devices, and more particularly, to an electronic device that displays and shares video with an external electronic device wirelessly connected thereto, in real-time.

2. Description of Related Art

With the development of mobile communication technology and processor technology, portable terminals (i.e., electronic devices) have been equipped with various functions as well. Electronic devices have been designed to include a touch panel-based display, which is capable of displaying videos created through various functions thereon. As used herein, the term "video" refers to a video or an image related to an application, web browser, video content, a display screen, etc.

As many electronic devices are capable of transmitting/receiving data to/from the same or different types of external devices via wired/wireless communication modes, when the electronic device is equipped with a video sharing technology (or a mirroring technology) the device is capable of simultaneously displaying video on both the electronic device and an external device. Video sharing technology allows an electronic device with a display to share screen data with an external device in such a way that the electronic device is able to transmit video displayed on the display screen of the electronic device to the external device, in a peer-to-peer (P2P) mode, via short-range wireless communication, such as WiFi, etc. The external device displays the received video on the display screen, thereby simultaneously displaying the same screen on both the electronic device and the external device. In general, video sharing technology has been used in situations when video on an electronic device with a relatively small display size needs to be displayed on a relatively large display size of an external device.

Conventional video sharing technologies of electronic devices establish a wireless communication connection between a source apparatus configured to transmit video and a sink apparatus configured to display video received from the source apparatus. The video is continuously transmitted therebetween until the connection is disconnected. When a user of the source apparatus wants to stop sharing a video with the sink apparatus, the user must manually release the wireless communication connection from the sink apparatus. When the user of the source apparatus wants to resume the transmission of the video to the sink apparatus, the user must manually operate to establish the wireless communication connection with the sink apparatus.

Therefore, when a user pauses the sharing of a video and then resumes sharing the video between the source and sink apparatuses via conventional video sharing technologies, the user is required to perform a number of processes, such as releasing the connection, searching for the sink apparatus, establishing the connection, etc., which causes user inconvenience.

SUMMARY

The present disclosure has been made to address the above-mentioned problems and/or disadvantages, and to provide at least the advantages described below.

Accordingly, an aspect of the present disclosure provides a method for an electronic device to control video sharing between a source apparatus and a sink apparatus, in such a way as to establish a connection for sharing video between the source apparatus and the sink apparatus, pause sharing of the video without additionally performing a separate connection release, and resume the sharing of the video.

In accordance with an aspect of the present disclosure, an electronic device is provided that includes a display, a communication circuit, a memory configured to store a video, and at least one processor. The at least one processor is configured to display first content of the video on the display, and based on a determination that a sharing function is selected by a user, perform the sharing function by: establishing, via the communication circuit, a wireless connection between the electronic device and an external device, ceasing display of the video on the display, displaying, on the display, a control user interface for controlling playback of second content of the video on a display of the external device and an icon for controlling the sharing function, the second content being a continuation of the first content of the video, wherein the icon is displayed on an upper layer over the control user interface, and the icon is movable within the display based on a touch input, and transmitting, via the wireless connection, the second content of the video to the external device without transmitting data associated with the icon such that the second content without the icon is displayable on the external device. The at least one processor is also configured to, based on a first user interaction involving the icon, control the sharing function by: ceasing transmission of the second content to the external device, transmitting, via the wireless connection, an image indicating a transmission status to the external device for display on the display of the external device, and displaying, on the display of the electronic device, third content of the video with the icon, the third content being a continuation of the second content, wherein the icon is displayed on the upper layer over the third content of the video, and the icon is movable within the display based on the touch input.

In accordance with another aspect of the present disclosure, a method of an electronic device for controlling image sharing is provided. First content of a video is displayed on a display of the electronic device. Based on a determination that a sharing function is selected by a user, the sharing function is performed by: establishing a wireless connection between the electronic device and an external device, ceasing display of the video on the display, displaying, on the display, a control user interface for controlling playback of second content of the video on a display of the external device and an icon for controlling the sharing function, the second content being a continuation of the first content of the video, wherein the icon is displayed on an upper layer over the control user interface, and the icon is movable within the display based on a touch input, and transmitting, via the wireless connection, the second content of the video to the external device without transmitting data associated with the icon such that the second content without the icon is displayable on the external device. Based on a first user interaction involving the icon, the sharing function is controlled by: ceasing transmission of the second content to the external device, transmitting, via the wireless connection, an image indicating a transmission status to the external device for display on the display of the external device, and displaying, on the display of the electronic device, third content of the video with the icon, the third content being a continuation of the second content, wherein the icon is displayed on the upper layer over the third content of the video, and the icon is movable within the display based on the touch input.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
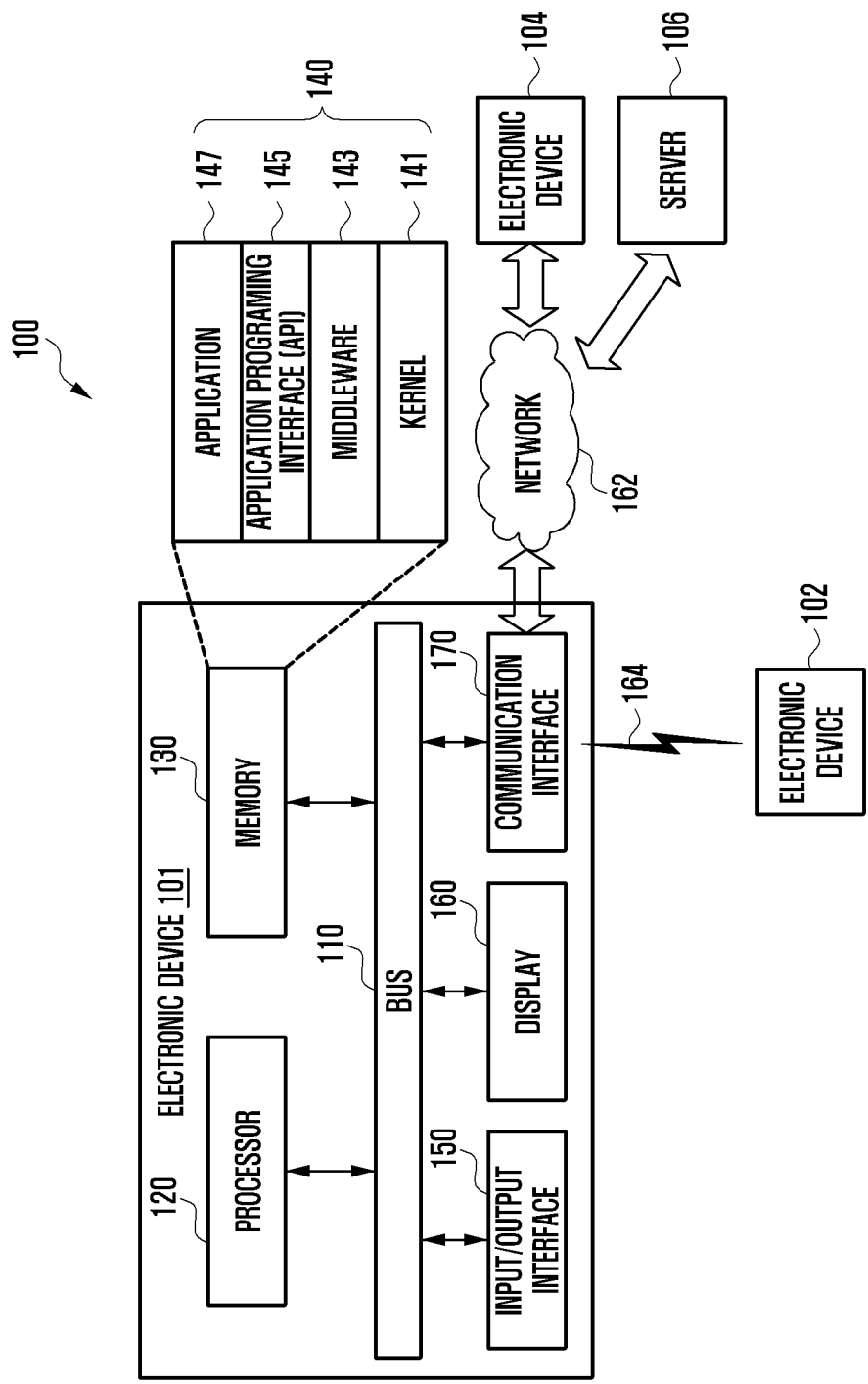
FIG. 1 is a block diagram of a network environment including an electronic device, according to an embodiment of the present disclosure.

Various embodiments of the present disclosure are described in detail with reference to the accompanying drawings, in which like reference numbers are used to refer to the same or like parts. While the present disclosure may be embodied in many forms, specific embodiments of the present disclosure are shown in drawings and are described herein in detail, with the understanding that the present disclosure is to be considered as an illustration of the principles of the disclosure and is not intended to limit the disclosure to the specific embodiments illustrated. The terms "comprise", "have", and "include", used herein, indicates the presence of a corresponding feature, such as a function, operation, element, characteristic, numeral, step, operation, component, etc., but does not limit additional features.

In the present disclosure, the expression "or" includes any combination or the entire combination of the listed items. For example, "A or B" may include A, B, or A and B.

The expressions "a first" and "a second", as used herein, may represent various elements of the present disclosure, but do not limit corresponding elements. For example, the expressions do not limit the order and/or importance of the corresponding elements. The expressions may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be directly coupled to the other element or coupled to the other element through a third element. However, when it is described that an element is "directly coupled" to another element, no element may exist between the element and the other element.

Terms used in the present disclosure are not intended to limit the present disclosure but, instead, to illustrate various embodiments of the present disclosure. As used herein, a reference to a singular form includes plural forms as well, unless is the context explicitly clearly indicates otherwise.

Unless differently defined, all terms used herein, including technical and scientific terms, have the same meaning as that commonly understood by a person of common skill in the art to which this disclosure pertains. It should be understood that terms defined in a generally used dictionary may be interpreted to have a meaning equivalent to the contextual meaning in the related technology, and are not to be interpreted to have ideal or excessively formal meanings unless explicitly so defined herein.

An electronic device, according to various embodiments of the present disclosure, may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., an head-mounted device (HMD) such as electronic glasses, electronic clothes, an electronic bracelet, an electronic necklace, an electronic appcessory, or a smart watch).

According to some embodiments, the electronic device may be a smart home appliance that involves a communication function. For example, an electronic device may be a TV, a digital versatile disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, the electronic device may be a medical device (e.g., a magnetic resonance angiography (MRA) device, a magnetic resonance imaging (MRI) device, a computed tomography (CT) device, an ultrasonography device, etc.), a navigation device, a global positioning system (GPS) receiver, an event data recorder (EDR), an flight data recorder (FDR), a car infotainment device, electronic equipment for a ship (e.g., a marine navigation system, a gyrocompass, etc.), an avionics device, security equipment, or an industrial or home robot.

According to some embodiments, the electronic device may be furniture or part of a building or construction having a communication function, an electronic board, an electronic signature receiving device, a projector, or various measuring instruments (e.g., a water meter, an electric meter, a gas meter, a wave meter, etc.). The electronic device may be a flexible device.

The electronic device disclosed herein may be one of the above-mentioned devices or any combination thereof. As well understood by those skilled in the art, the above-mentioned electronic devices are provided for illustration only and not to be considered as a limitation of this disclosure.

FIG. 1 is a block diagram of a network environment including an electronic device, according to an embodiment of the present disclosure.

Referring to FIG. 1, a network 100 including an electronic device 101 is provided. The electronic device 101 includes a bus 110, a processor 120, a memory 130, an input/output interface 150, a display 160, and a communication interface 170.

The bus 110 is a circuit for interconnecting the elements of the electronic device 101 described above, and for allowing a communication, e.g. by transferring a control message, between the elements of the electronic device 101.

The processor 120 receives commands from the above-mentioned other elements of the electronic device 101, e.g. the memory 130, the input/output interface 150, the display 160, and the communication interface 170, through the bus 110. The processor 120 deciphers the received commands and performs operations and/or data processing according to the deciphered commands.

The memory 130 stores commands received from the processor 120 and/or other elements of the electronic device 101, e.g. the input/output interface 150, the display 160, and the communication interface 170, and/or commands and/or data generated by the processor 120 and/or other elements of the electronic device 101. The memory 130 may include software and/or programs 140, such as a kernel 141, middleware 143, an Application Programming Interface (API) 145, and an application 147. Each of the programming modules may be configured by software, firmware, hardware, and/or a combinations thereof.

The kernel 141 controls and/or manages system resources, e.g. the bus 110, the processor 120 or the memory 130, used for execution of operations and/or functions implemented in other programming modules, such as the middleware 143, the API 145, and/or the application 147. Further, the kernel 141 provides an interface through which the middleware 143, the API 145, and/or the application 147 can access and then control and/or manage an individual element of the electronic device 101.

The middleware 143 performs a relay function which allows the API 145 and/or the application 147 to communicate with and exchange data with the kernel 141. Further, in relation to operation requests received from at least one of the application 147, the middleware 143 performs load balancing in relation to the operation requests by, for example, giving a priority in using a system resource, e.g. the bus 110, the processor 120, and/or the memory 130, of the electronic device 101 to at least one of the application 147.

The API 145 is an interface through which the application 147 controls a function provided by the kernel 141 and/or the middleware 143, and may include at least one interface or function for file control, window control, image processing, and/or character control.

The input/output interface 150 receives a command and/or data from a user, and transfers the received command and/or data to the processor 120 and/or the memory 130 through the bus 110. The display 160 can display an image, a video, and/or data to a user.

The display 160 includes a liquid crystal display (LCD), a flexible display, a transparent display, a light emitting diode (LED) display, an organic light emitting diode (OLED) display, an active matrix-OLED (AM-OLED) display, a micro-electro-mechanical systems (MEMS) display, an electronic paper display, etc. The display 160 displays various types of content (e.g., texts, images, videos, icons, symbols, etc.). The display 160 may also be implemented with a touch screen. In this case, the display 160 receives touches, gestures, proximity inputs or hovering inputs, via a stylus pen, or a user's body.

The communication interface 170 establishes a communication between the electronic device 101 and an external device, such as a first external electronic device 102, a second external electronic device 104, and/or a server 164. For example, the communication interface 170 communicates with the first external electronic device 102 via short-range communication 164 and communicates with the second external electronic device 104 and the server 106 connected to a network 162 via wired or wireless communication Wireless communication may include long-term evolution (LTE), LTE advance (LTE-A), code division multiple access (CDMA), wideband CDMA (WCDMA), universal mobile telecommunications system (UMTS), Wireless Broadband (WiBro), and global system for mobile communication (GSM). Wireless communication may also include the short-wireless communication 164. Short-wireless communication 164 may include WiFi, Bluetooth (BT), and near field communication (NFC) protocol, magnetic secure transmission (MST), and global navigation satellite system (GNSS). The GNSS may include at least one of global positioning system (GPS), global navigation satellite system (Glonass), Beidou navigation satellite system (Beidou, Galileo, the European global satellite-based navigation system, according to GNSS using areas, bandwidths, etc.

Wired communication may include universal serial bus (USB), high definition multimedia interface (HDMI), recommended standard 232 (RS-232), and plain old telephone service (POTS).

The network 162 may include, the Internet, a local area network (LAN), a Wide area network (WAN), a telecommunication network, a cellular network, a satellite network, or any other similar and/or suitable communication networks.

Each of the first and second external electronic devices 102 and 104 may be of the same type or of a different type than the electronic device 101.

Figure 2:
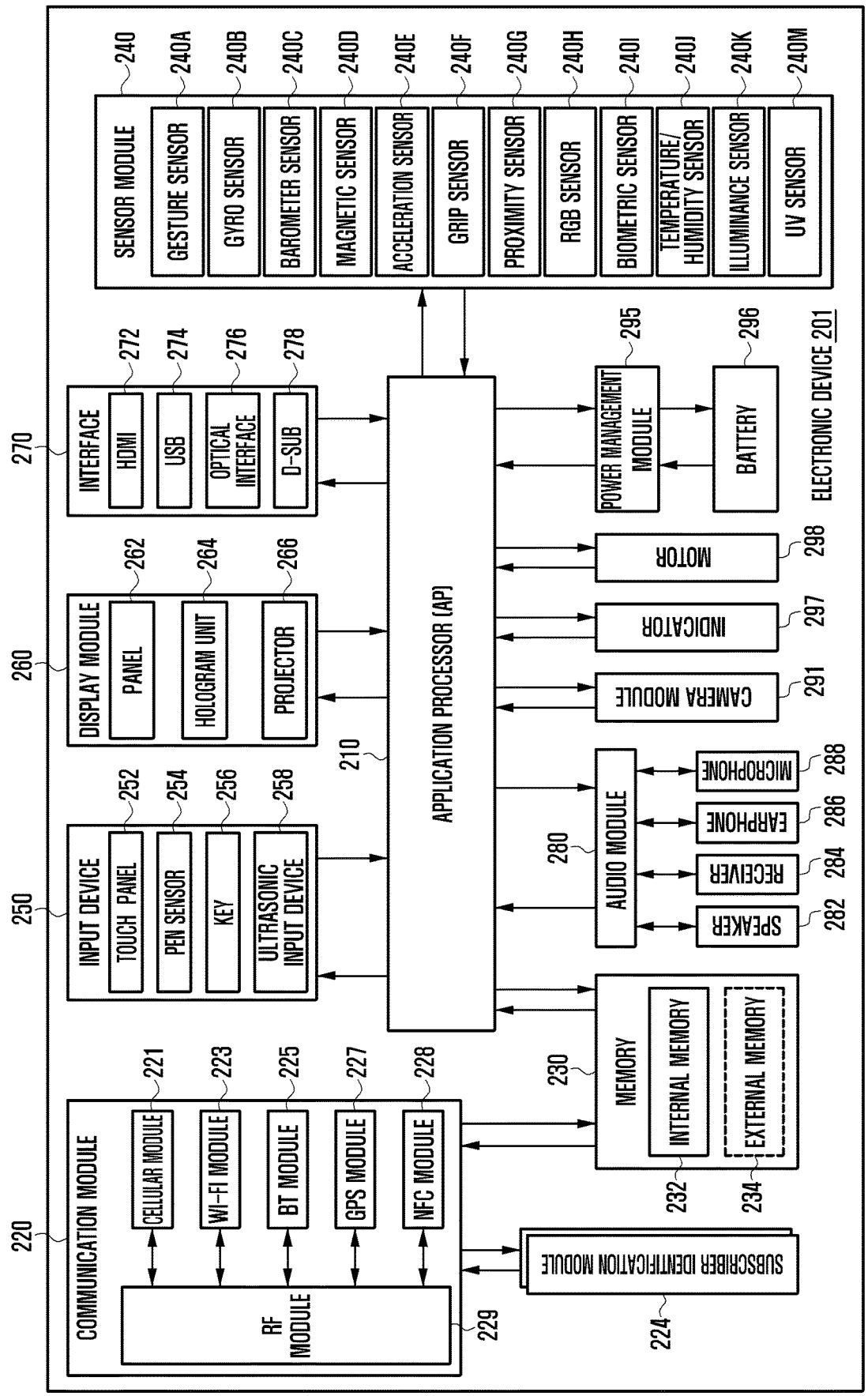
FIG. 2 is a block diagram of a configuration of an electronic device, according to an embodiment of the present disclosure.

FIG. 2 is a block diagram of a configuration of an electronic device, according to an embodiment of the present disclosure Referring to an electronic device 201 is provided. The electronic device 201 may include the whole or a part of the electronic device 101 shown in FIG. 1. The electronic device 201 may include at least one application processor (AP) 210, a communication module 220, a subscriber identification module (SIM) 224, a memory 230, a sensor module 240, an input device 250, a display module 260, an interface 270, an audio module 280, a camera module 291, a power management module 295, a battery 296, an indicator 297, and a motor 298.

The AP 210 drives an operating system or applications, controls a plurality of hardware or software components connected thereto, and also performs processing and operation for various data including multimedia data. The AP 210 may be implemented as a system-on-chip (SoC). The AP 210 may further include a graphic processing unit (GPU).

The communication module 220 performs data communication with an external electronic device (e.g., the first external electronic device 102, the second external electronic device 104, or the server 106). The communication module 220 may include therein a cellular module 221, a WiFi module 223, a BT module 225, a GPS module 227, an NFC module 228, and a radio frequency (RF) module 229.

The cellular module 221 may offer a voice call, a video call, a message service, an internet service, etc. through a communication network (e.g., LTE, LTE-A, CDMA, WCDMA, UMTS, WiBro, or GSM, etc.). Additionally, the cellular module 221 may perform identification and authentication of the electronic device 201 in the communication network, using the SIM 224. The cellular module 221 may perform at least part of functions the AP 210 provides. For example, the cellular module 221 may perform at least part of a multimedia control function.

The cellular module 221 may include a communication processor (CP). Additionally, the cellular module 221 may be implemented as an SoC. Although some elements, such as the cellular module 221 (e.g., the CP), the memory 230, or the power management module 295 are shown as elements separate from the AP 210, the AP 210 may be implemented to include at least part (e.g., the cellular module 221) of the above elements.

The AP 210 or the cellular module 221 (e.g., the CP) may load commands or data, received from a nonvolatile memory connected thereto or from at least one of the other elements of the electronic device 201, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although the cellular module 221, the WiFi module 223, the BT module 225, the GPS module 227 and the NFC module 228 are shown as different components, at least part of them may be contained in a single integrated circuit (IC) chip or a single IC package. For example, at least part (e.g., the CP corresponding to the cellular module 221, and a WiFi processor corresponding to the WiFi module 223) of respective processors corresponding to the cellular module 221, the WiFi module 223, the BT module 225, the GPS module 227 and the NFC module 228 may be implemented as a single SoC.

The RF module 229 transmits and receives data, e.g., RF signals or any other electric signals. The RF module 229 may include a transceiver, a power amp module (PAM), a frequency filter, a low noise amplifier (LNA), etc. Also, the RF module 229 may include a component, e.g., a wire or a conductor, for transmission of electromagnetic waves in a free air space. Although the cellular module 221, the WiFi module 223, the BT module 225, the GPS module 227 and the NFC module 228 are shown to share the RF module 229, at least one of them may perform transmission and reception of RF signals through a separate RF module.

The SIM 224 may be a card including SIM, which may be inserted into a slot formed at a certain place of the electronic device 201, or may be an embedded SIM. The SIM 224 contains unique identification information, e.g., an integrated circuit card identifier (ICCID), or subscriber information, e.g., an international mobile subscriber identity (IMSI).

The memory 230 may include an internal memory 232 and an external memory 234.

The internal memory 232 may include at least one of a volatile memory (e.g., dynamic random access memory (DRAM), static RAM (SRAM), synchronous DRAM (SDRAM), etc.) or a nonvolatile memory (e.g., one-time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). The internal memory 232 may include a solid state drive (SSD).

The external memory 234 may include a flash drive, e.g., compact flash (CF), secure digital (SD), micro-secure digital (Micro-SD), mini-secure digital (Mini-SD), eXtreme Digital (xD), memory stick, etc. The external memory 234 may be functionally connected to the electronic device 201 through various interfaces. The electronic device 201 may further include a storage device or medium such as a hard drive.

The sensor module 240 measures a physical quantity or senses an operating status of the electronic device 201, and then converts the measured or sensed information into electric signals. The sensor module 240 may include, for example, a gesture sensor 240A, a gyro sensor 240B, an atmospheric sensor 240C, a magnetic sensor 240D, an acceleration sensor 240E, a grip sensor 240F, a proximity sensor 240G, a red, green, blue (RGB) sensor 240H, a biometric sensor 240, a temperature/humidity sensor 240J, an illuminance sensor 240K, and a ultraviolet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 240 may include a control circuit for controlling one or more sensors equipped therein.

The input device 250 may include a touch panel 252, a digital pen sensor 254, a key 256, or an ultrasonic input unit 258.

The touch panel 252 recognizes a touch input in a manner of capacitive type, resistive type, infrared type, or ultrasonic type. In case of a capacitive type, a physical contact or proximity may be recognized. The touch panel 252 may further include a tactile layer. In this case, the touch panel 252 may offer a tactile feedback to a user. The touch panel 252 may further include a control circuit.

The digital pen sensor 254 may be formed in the same or similar manner as the touch panel 252 for receiving a touch input, or by using a separate recognition sheet.

The key 256 may include a physical button, an optical key, or a keypad.

The ultrasonic input unit 258 is identifies data by sensing sound waves with a microphone 288 in the electronic device 201 through an input tool that generates ultrasonic signals, thus allowing wireless recognition.

According to an embodiment, the electronic device 201 may receive a user input from any external device (e.g., a computer or a server) connected thereto through the communication module 220.

The display 260 may include a panel 262, a hologram unit 264, or a projector 266.

The panel 262 may be, for example, an LCD display, an AM-OLED display, etc. The panel 262 may have a flexible, transparent, or wearable form. The panel 262 may be formed of a single module with the touch panel 252.

The hologram unit 264 may display a stereoscopic image in the air using an interference of light.

The projector 266 may project an image onto a screen, which may be located at the inside or outside of the electronic device 201.

The display 260 may further include a control circuit for controlling the panel 262, the hologram unit 264, and the projector 266.

The interface 270 may include, a high-definition multi-media Interface (HDMI) 272, a (USB) 274, an optical interface 276, or a d-subminiature (D-sub) 278. The interface 270 may be contained in the communication interface 260 shown in FIG. 2. Additionally or alternatively, the interface 270 may include a mobile high-definition link (MHL) interface, a secure digital (SD) card/multi-media card (MMC) interface, or an infrared data association (IrDA) interface.

The audio module 280 performs a conversion between sounds and electric signals. The audio module 280 may process sound information input or output through a speaker 282, a receiver 284, an earphone 286, or the microphone 288.

The camera module 291 is a device capable of obtaining still images and moving images. The camera module 291 may include at least one image sensor (e.g., a front sensor or a rear sensor), a lens, an image signal processor (ISP), or a flash (e.g., LED or xenon lamp).

The power management module 295 manages electric power of the electronic device 201. The power management module 295 may include a power management integrated circuit (PMIC), a charger IC, or a battery gauge.

The PMIC may be formed of an IC chip or SoC. Charging may be performed in a wired or wireless manner. The charger IC may charge a battery 296 and prevent overvoltage or overcurrent from a charger. A wireless charging type may include a magnetic resonance type, a magnetic induction type, or an electromagnetic type. An additional circuit for a wireless charging, such as a coil loop, a resonance circuit, or a rectifier, may be further used.

The battery gauge measures a residual amount, a voltage, current, or temperature of the battery 296. The battery 296 stores or creates electric power therein and supplies electric power to the electronic device 201. The battery 296 may be a rechargeable battery or a solar battery.

The indicator 297 displays a status (e.g., a booting status, a message status, or a recharging status) of the electronic device 201 or of a part (e.g., the AP 210) of the electronic device 201.

The motor 298 converts an electric signal into a mechanical vibration.

The electronic device 201 may include a specific processor (e.g., GPU) for supporting a mobile TV. This processor may process media data that complies with standards of digital multimedia broadcasting (DMB), digital video broadcasting (DVB), or media flow.

Each of the above-described elements of the electronic device 201 disclosed herein may be formed of one or more components, and its name may vary according to the type of the electronic device. The electronic device 201 may include some of the above-described elements, may omit some of the elements, or may include additional other elements. Some of the elements may be integrated into a single entity that performs the same functions as those of such elements before integrated.

The term "module" used herein may refer to a unit that includes hardware, software, firmware, or any combination thereof. The module may be interchangeably used with the term unit, logic, logical block, component, or circuit. The module may be the minimum unit, or part thereof, which performs one or more particular functions. The module may be formed mechanically or electronically. For example, the module disclosed herein may include at least one of an application-specific integrated circuit (ASIC) chip, a field-programmable gate array (FPGA), and a programmable-logic device, which have been known or are to be developed.

Figure 3:
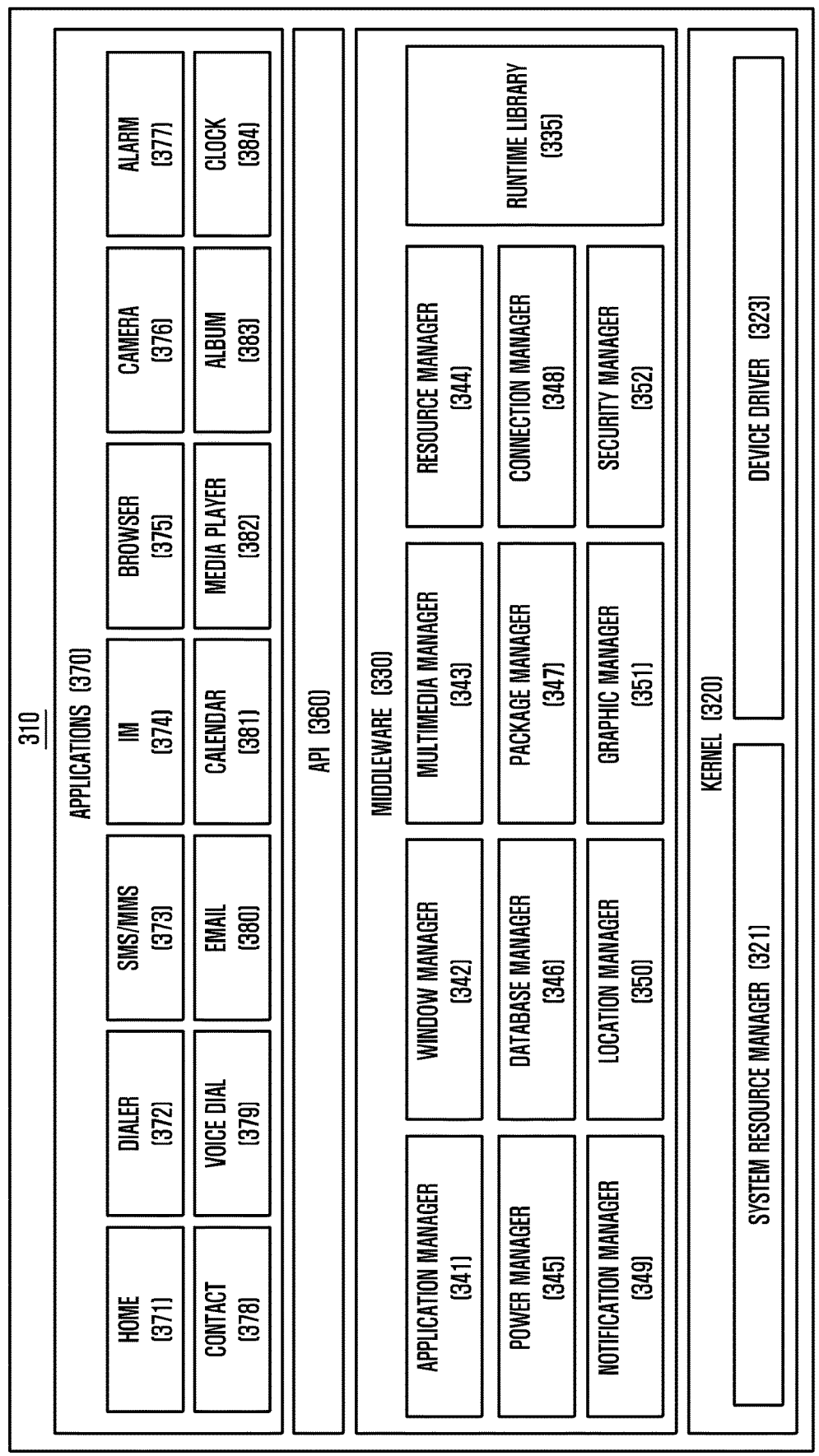
FIG. 3 is a block diagram of a program module, according to an embodiment of the present disclosure.

FIG. 3 is a block diagram of a program module, according to an embodiment of the present disclosure.

Referring to FIG. 3, a programming module 310 is provided. The programming module 310 may be stored in the memory 230 of the electronic device 201. At least a part of the programming module 310 may be implemented in software, firmware, hardware, or a combination thereof. The programming module 310 may include an OS controlling resources related to the electronic device 201 and/or various applications 370 executed in the OS. For example, the OS may be Android™, iOS™, Windows™, Symbian™, Tizen™, Bada™, etc.

The programming module 310 includes a kernel 320, a middleware 330, an API 360, and the applications 370.

The kernel 320 includes a system resource manager 321 and a device driver 323.

The system resource manager 321 may include a process manager, a memory manager, and a file system manager. The system resource manager 321 performs the control, allocation, recovery, and/or the like of system resources.

The device driver 323 may include a display driver, a camera driver, a Bluetooth driver, a shared memory driver, a USB driver, a keypad driver, a WiFi driver, and/or an audio driver. Also, according to an embodiment of the present disclosure, the device driver 323 may include an inter-process communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device 201. For example, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include a library module used by a complier, in order to add a new function by using a programming language during the execution of the application 370. The runtime library 335 may perform functions which are related to input and output, the management of a memory, an arithmetic function, etc.

The application manager 341 manages a life cycle of at least one of the applications 370.

The window manager 342 manages GUI resources used on the screen.

The multimedia manager 343 detects a format used to reproduce various media files and encodes or decodes a media file through a codec appropriate for the relevant format.

The resource manager 344 manages resources, such as a source code, a memory, a storage space, etc. of at least one of the applications 370.

The power manager 345 operates together with a basic input/output system (BIOS), manages a battery or power, and provides power information used for an operation.

The database manager 346 manages a database in such a manner as to enable the generation, search and/or change of the database to be used by at least one of the applications 370.

The package manager 347 manages the installation and/or update of an application distributed in the form of a package file.

The connectivity manager 348 manages a wireless connectivity such as Wi-Fi and Bluetooth.

The notification manager 349 displays or reports, to the user, an event, such as an arrival message, an appointment, a proximity alarm, etc., in such a manner as not to disturb the user.

The location manager 350 manages location information of the electronic device 201.

The graphic manager 351 manages a graphic effect, which is to be provided to the user, and/or a user interface related to the graphic effect.

The security manager 352 may provide various security functions used for system security, user authentication, etc.

When the electronic device 201 has a telephone function, the middleware 330 may further include a telephony manager for managing a voice telephony call function and/or a video telephony call function of the electronic device.

The middleware 330 generates and uses a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements, may further include other elements, or may replace some of the elements with other elements, each of which performs a similar function and has a different name.

The API 360 is a set of API programming functions, and may be provided with a different configuration according to an OS. In the case of Android™ or iOS™, for example, one API set may be provided to each platform. In the case of Tizen™, for example, two or more API sets may be provided to each platform.

The applications 370 may include a preloaded application and/or a third party application. The applications 370 may include a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by the application processor 210, the application processor 210 may perform functions corresponding to the instructions. The non-transitory computer-readable storage medium may be the memory 220. At least apart of the programming module 310 may be implemented by the application processor 210. At least apart of the programming module 310 may include a module, a program, a routine, a set of instructions, and/or a process for performing one or more functions.

Hereinafter, various embodiments of the present disclosure describe a method of sharing video, pausing transmission of the video, and resuming transmission of the video, with reference to FIGS. 4A to 9.

In the present disclosure, when a video sharing function is executed in an electronic device, the electronic device serves as a source apparatus configured to transmit video to an external device.

Accordingly, when the video sharing function is executed, the external device serves as a sink apparatus configured to receive video from the electronic device and display the received video. The external device may be the same type as the electronic device. Alternatively, the external device may be a device that differs in type from the electronic device, e.g., a digital TV, a monitor device, etc. The external device according to the present disclosure may be various types of electronic devices which are equipped with a wireless communication function and a display function.

In the following description, the electronic device is a portable terminal (a mobile device) with a relatively small display size and the external device is a television with a large display size; however, the present disclosure is not limited to the embodiments described.

Further, the electronic device and the external device are connected to each other, using a wireless mode, such as via WiFi, Bluetooth, NFC, GNSS, etc. The external device receives video data from the electronic device via the wireless mode and displays the received video data on the display screen.

The video sharing function is a function that transmits a video from an electronic device to an external device in wireless mode and displays the video on the display screen of the external device. When the video sharing function is executed, the electronic device operates in a first mode where a first video (e.g., a content video or a video displayed on the display screen of the electronic device) is transmitted to an external device, in real time, and in a second mode where the transmission of the first video is paused and a second video (e.g., a video corresponding to a freeze screen, or a still image) that differs from the first video is transmitted to an external device. When the video sharing function is executed, the electronic device establishes the wireless communication connection with an external device, and maintains a communication channel (e.g., a data channel and a control channel) with the external device in the first mode and the second mode.

Figure 4A:
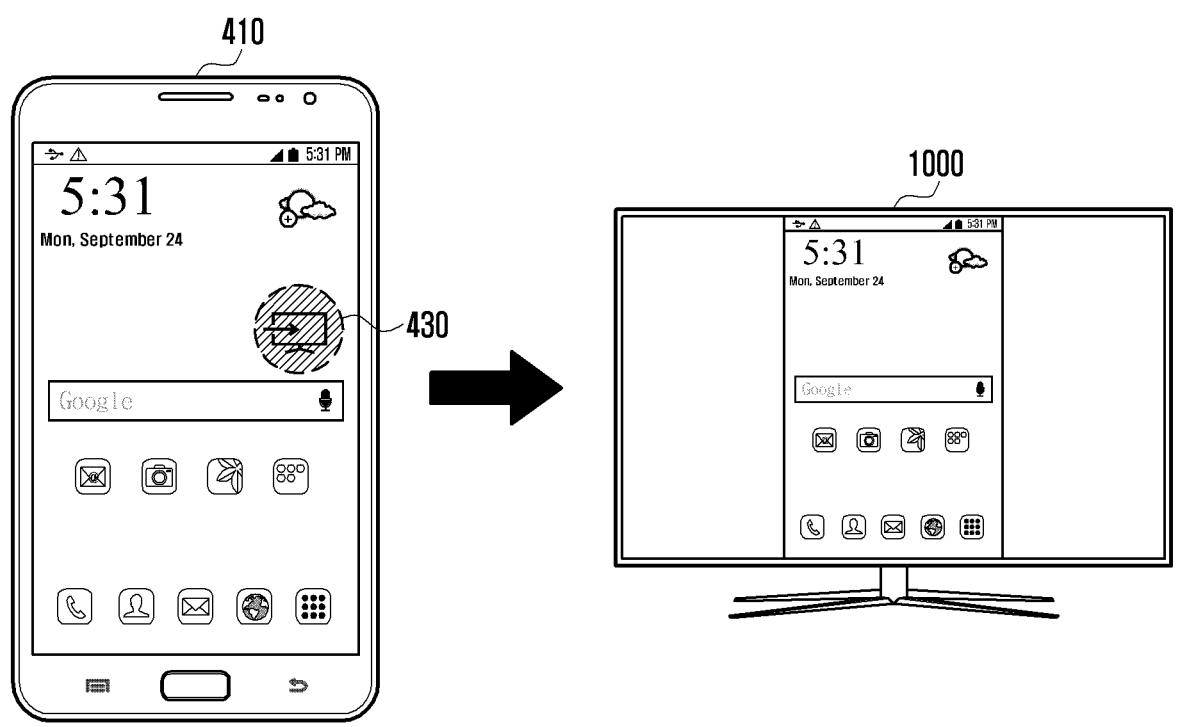
FIGS. 4A and 4B illustrate a method of sharing video between an electronic device and an external device, according to an embodiment of the present disclosure.
Figure 4B:
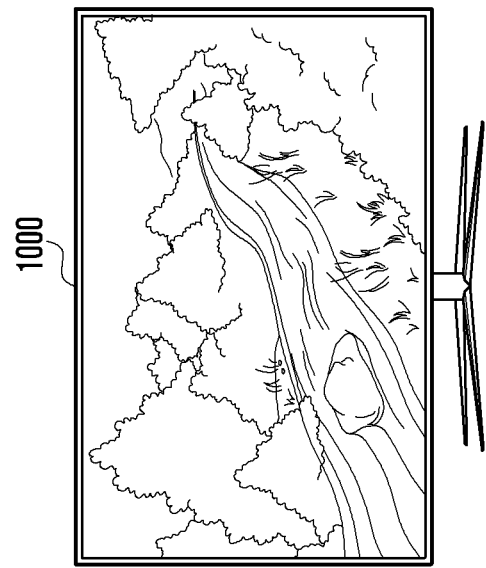
Figure 4B:
Figure 4B:
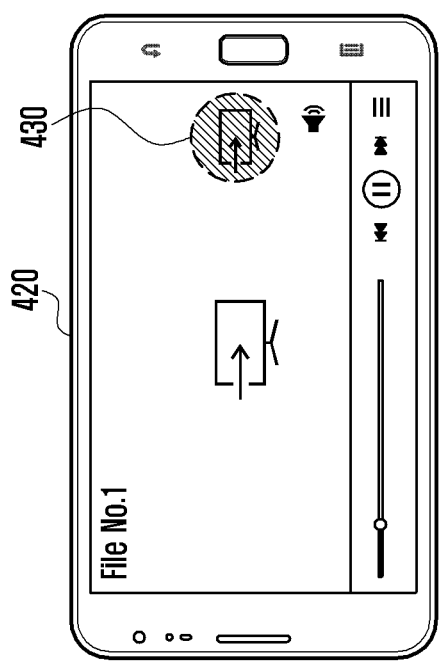

FIGS. 4A and 4B illustrate a method of sharing video between an electronic device and an external device, according to an embodiment of the present disclosure.

Referring to FIG. 4A, an electronic device 410 and an external device 1000 are provided. When a video sharing function is executed and the electronic device 410 and the external device 1000 are connected to each other in wireless mode, the external device 1000 is capable of displaying the same video as that displayed on the display screen of the electronic device 410. For example, in a state where the electronic device 410 displays a home screen showing icons corresponding to various applications on the display screen, when the video sharing function is executed, the electronic device 410 transmits the video of the home screen to the external device 1000, and then the external device 1000 displays the same home screen as that of the electronic device 410 on the display screen.

Referring to FIG. 4B, an electronic device 420 and the electronic device 1000 are provided. When the electronic device 420 transmits a content video to the external device 1000, the external device 1000 displays the received content video on the display screen of the external device 1000. In addition, the electronic device 420 may display, on a display screen of the electronic device 420, a control video for controlling the playback of the transmitted content video, simultaneously or at any other time, when the external device 1000 displays the received content video.

As shown in FIG. 4B, the control video is configured in such a way that a name of content and an icon showing a list of executable content items are located on the top and a play slide bar, and an icon for searching for content and pausing or playing content and a volume control icon are shown on the bottom. The control video shown in FIG. 4B is provided for illustration purpose only and the present disclosure is not limited thereto.

In various embodiments, the electronic device 420 is capable of transmitting content video to the external device 1000, in a streaming mode, in real-time.

When the video sharing function is executed and the electronic device 410 or 420 and the external device 1000 are connected to each other in wireless mode, the electronic device 410 or 420 transmits a video to the external device 1000 and displays, on the display screen of the electronic device 410 and 420, an icon 430 for pausing the transmission of the video, resuming the transmission of the video, or releasing the connection with the external device 1000. The icon 430 is displayed on part of the screen area of the electronic device 410 or 420 while transmitting the first video or pausing the transmission of the first video. The icon 430 may not be displayed on the display screen of the external device 1000.

The icon 430 may change to a floating state according to a user input (e.g., a long touch). When the icon 430 is in a floating state, it may move on the display screen according to a user input (e.g., a drag or a flick).

Figure 5:
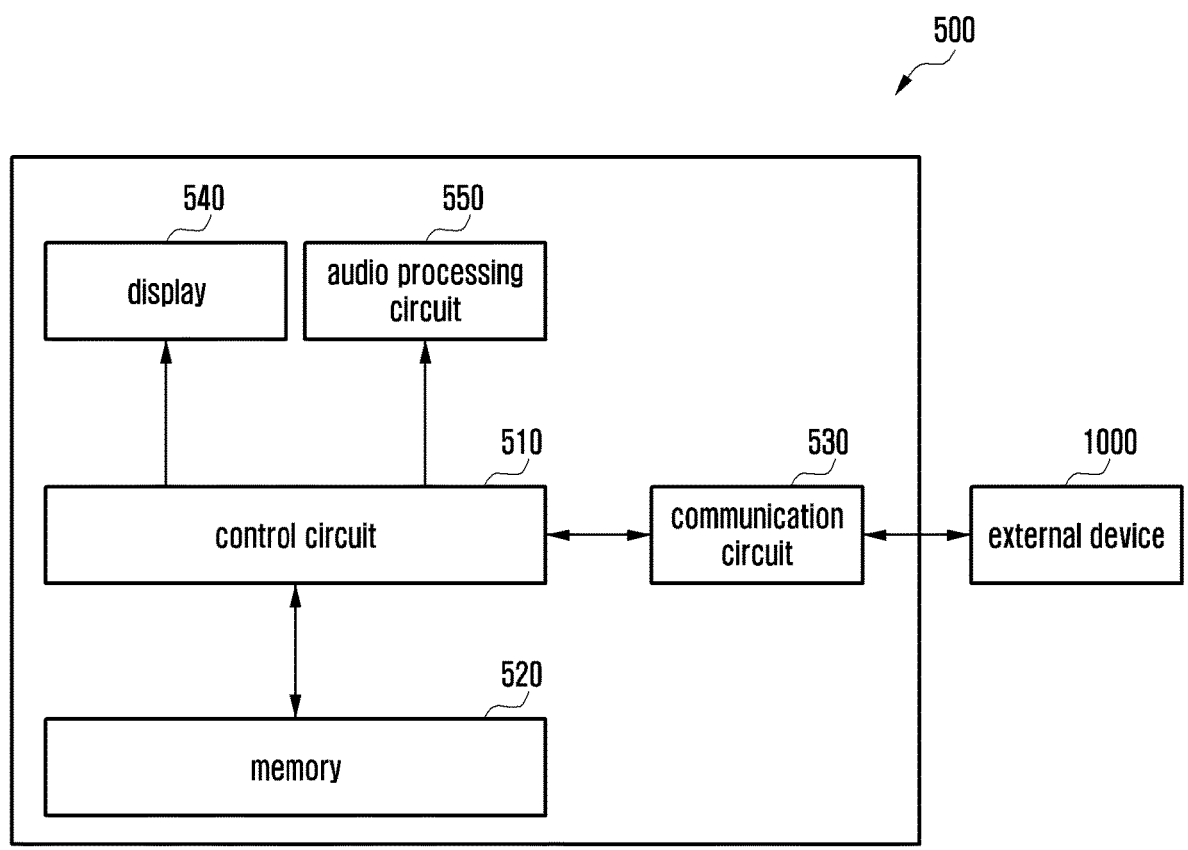
FIG. 5 is a block diagram of an electronic device, according to an embodiment of the present disclosure.

FIG. 5 is a block diagram of an electronic device, according to an embodiment of the present disclosure.

Referring to FIG. 5, an electronic device 500 is provided. The electronic device 500 includes a control circuit 510, a memory 520, a communication circuit 530, a display 540 and an audio processing circuit 550. The electronic device 500 may also be modified in such a way that part of the components are removed or replaced with equivalent components. The electronic device 500 may further include part of the components in the electronic device 101 shown in FIG. 1 and/or the electronic device 201 shown in FIG. 2.

The display 540 displays video. The display 540 may be implemented with LCD, LED display, an OLED display, a MEMS display, an electronic paper display, etc. The display 540 may further include part of the components in the display 160 shown in FIG. 1 and/or the display 260 shown in FIG. 2. The display 540 includes a touch screen panel. In this case, the touch screen panel detects a touch input or a hovering input applied to the window of the display 540.

The communication circuit 530 transmits/receives data to/from the external device 1000. The communication circuit 530 may include part of the components in the communication interface 170 shown in FIG. 1 and/or in the communication module 220 shown in FIG. 2. The communication circuit 530 communicates with the external device 1000 in a short-range wireless communication mode, e.g., Wi-Fi, etc. The communication circuit 530 is configured to include two or more antennas that are capable of performing the transmission/reception of data via different frequency bands. When the electronic device 500 receives video in a streaming mode via a network and transmits the received video to the external device 1000, in real-time, using the video sharing function, the communication circuit 530 receives the streaming videos from an access point connected to the network via one antenna and transmits the received videos to the external device 1000 via another antenna.

The memory 520 is implemented to include a volatile memory and a non-volatile memory, but is not limited thereto. The memory 520 is electrically connected to the control circuit 510. The memory 520 stores instructions enabling the control circuit 510 to perform corresponding functions. The instructions include control commands for instructing the control circuit 510 to perform arithmetic operations, logic operations, data transfer function, input/output functions, etc.

The control circuit 510 controls components in the electronic device 500, performs functions related to communication, and processes data. The control circuit 510 includes part of the components in the processor 120 shown in FIG. 1 and/or in the application processor 210 shown in FIG. 2. The control circuit 510 is electrically connected to components in the electronic device 500, such as, the display 540, the memory 520, the communication circuit 530, the audio processing circuit 550, etc.

The control circuit 510 is not limited to the operations/functions and the data process function of the electronic device 500 described above. The control circuit 510 controls the display 540 to display video and the communication circuit 530 to transmit the video to the external device 1000. The control circuit 510 loads instructions from the memory 520 and executes the instructions to perform corresponding functions.

The audio processing circuit 550 processes audio signals and amplifies and outputs the signals. The audio processing circuit 550 may output the audio signals via a speaker built in the electronic device 500 or earphones (or an external speaker) connected in wired/wireless mode to the electronic device 500.

The electronic device 500 is capable of establishing a wireless communication connection with the external device 1000 according to the execution of the video sharing function. For example, the communication circuit 530 of the electronic device 500 connects to the external device 1000, in wireless mode, via Wi-Fi direct (or Wi-Fi P2P). When the electronic device 500 receives a discovery signal, broadcast periodically from the external device 1000 via the communication circuit 530, the electronic device 500 considers that it can connect to the external device 1000 and attempts to connect to the external device 1000 according to a user's selection. The communication circuit 530 forms a group with the selected external device 1000 and creates a session with the external device 1000. The created session may be maintained, regardless of the transmission of a first video, until the communication circuit 530 is disconnected from the external device 1000.

When the electronic device 500 establishes the wireless communication connection with the external device 1000 according to the execution of the video sharing function, the electronic device 500 transmits a first video to the external device 1000 via the communication circuit 530. The first video may be the same video (e.g., a home screen) as that displayed on the display 540 of the electronic device 500.

Alternatively, the first video may be a content video which is stored in the memory 520 of the electronic device 500 or is received in a streaming mode from external to the electronic device 500 via the communication circuit 530.

The control circuit 510 displays a first video or a control video for controlling the first video on the display 540, simultaneously or at any other time, when the communication circuit 530 transmits the first video to the external device 1000. For example, when the first video is a video displayed on a home screen of the electronic device 500, the control circuit 510 displays the first video on the display 540. When the first video is a content video, the control circuit 510 displays the control video on the display 540.

When the first video is transmitted, simultaneously or at any other time, the control circuit 510 displays an icon on at least part of the display 540. The icon is for pausing execution of the video sharing function, resuming transmission of the video, or releasing the connection with the external device 1000. The icons displayed according to the execution of the video sharing function will be described in detail with reference to FIGS. 8C to 8F.

The icon may be implemented with a toggle button. When the control circuit 510 detects a first input and a second input applied to the icon, the control circuit 510 changes the video sharing function from a first mode to a second mode or vice versa. The first mode refers to an operation where the control circuit 510 transmits the first video to the external device 1000. The second mode refers to an operation where the control circuit 510 pauses the transmission of the first video and transmits, to the external device 1000, a second video that differs from the first video.

The first input and the second input may be the same type of input. For example, the first input and the second input may be a touch input or a hovering input applied to the icon. The display 540 detects the first input and the second input via the touch screen panel and transfers the detected input to the control circuit 510.

The second input refers to an input detected in a second mode for pausing the transmission of the first video. In addition, a third input refers to an input detected in a first mode and a second mode. The third input differs from the first input and the second input.

When the control circuit 510 detects a first input applied to the displayed icon, it pauses the transmission of the first video and transmits a second video to the external device 1000 via the communication circuit 530. The second video may be a video corresponding to a freeze screen. For example, the second video may be a still image containing text, e.g., pause. The video sharing function changes a first mode to a second mode according to the first input. The second mode is a state pausing the transmission of the first video, maintaining the wireless communication connection between the communication circuit 530 and the external device 1000, like the first mode. In the second mode, the session between the communication circuit 530 and the external device 1000 is maintained and the channel for performing the transmission of data (e.g., a data channel and a control channel) is also maintained.

When a conventional electronic device continuously or automatically transmits the first video to the external device 1000, the conventional electronic device may transmit video or data that the user does not want to share, e.g., a list of photographs, personal information, along with the first video. In this case, in order to pause the sharing of the first video with the external device 1000, the user needs to release the wireless connection with the external device 1000. To resume sharing the first video, the user needs to operate the conventional electronic device to search for the external device 1000 and to establish the connection, which causes user inconvenience.

To resolve the above-mentioned problem, the electronic device 500, according to various embodiments of the present disclosure, operates in a second mode pausing the execution of the video sharing function, or in sharing the first video. During the second mode, the electronic device 500 transmits a second video corresponding to a freeze screen to the external device 1000, while maintaining the connection with the external device 1000. In addition, during the second mode, the external device 1000 displays the received second video on the display screen, thereby informing the user that the video sharing function is in a 'pause' state.

The second video may be a still image corresponding to a pause state of the screen. The second video will be described in detail with reference to FIGS. 7A and 7B.

The control circuit 510 controls the communication circuit 530 to pause the transmission of a first video, in response to the detection of a first input, and to transmit a second video as a still image at a preset period. The external device may release the connection with the electronic device 500 when additional video data is not received from the electronic device 500 for a preset period of time. To resolve the problem, the electronic device 500 is performs a transmission of a second video to the external device 1000 periodically (e.g., every one minute or five minutes). In this case, the electronic device 500 maintains the wireless communication connection with the external device 1000 in a second mode.

When the electronic device 500 operates the video sharing function in the second mode according to the first input, a second video may be transmitted only once.

When the video sharing function is executed, the control circuit 510 transmits the first video to the external device 1000, and simultaneously or at any other time, displays the first video as shown in FIG. 4A or a control video for controlling the first video as shown in FIG. 4B on the display 540.

When the control circuit 510 displays the first video on the display 540 and the control circuit 510 detects a first input, transmission of the first video to the external device 1000 may be paused. In this case, the control circuit 510 may still display the first video on the display 540.

When the control circuit 510 displays a control video for controlling the first video on the display 540 and the control circuit 510 detects a first input, the first video is displayed on the display 540. That is, while the electronic device 500 displays the first video on the display 540, the external device 1000 displays a second video on the display screen. In this case, the user of the electronic device 500 views the first video on the display 540 of the electronic device 500. However, users viewing the external device 1000 do not view the first video on the display screen of the external device 1000 and instead view the second video.

The control circuit 510 controls the communication circuit 530 to resume the transmission of the first video, in response to the detection of a second input applied to an icon. The second input may be the same type as the first input (e.g., a touch input or a hovering input applied to an icon) received in the second mode.

The control circuit 510 controls the communication circuit 530 to release the wireless communication connection with the external device 1000, in response to the detection of a third input applied to an icon. The third input may be an input that differs in type from the first input and the second input. For example, the third input may be a touch input for dragging and dropping an icon from on location to another. The third input is detected in a first mode and a second mode. Therefore, the third input may terminate the video sharing function while transmitting the first video or pausing the transmission of the first video.

The control circuit 510 controls the communication circuit 530 to transmit the first video and first audio data corresponding to the first video to the external device 1000. In this case, while the electronic device 500 displays the first video or the control video for controlling the first video on the display 540, the external device 1000 outputs the first video and the corresponding first audio data. When the control circuit 510 detects a first input, it pauses the transmission of the first video and the first audio data, displays the first video on the display 540, and transfers the first audio data to the audio processing circuit 550, thereby enabling the audio processing circuit 550 to output the first audio data via a speaker, built in the electronic device 500, or earphones (or an external speaker) connected in wired/wireless mode to the electronic device 500. In another embodiment, the control circuit 510 may control not to output the first audio data via the external device 1000 or the electronic device 500, in response to the first input.

When the control circuit 510 detects a second input, the first video and the first audio data are transmitted to the external device 1000 as before detecting the first input. In this case, the first audio data may not be output via the electronic device 500.

The icon may include a first sub icon related to the transmission of a first video and a second sub icon related to the transmission of first audio data.

The control circuit 510 pauses/resumes the transmission of the first video to the external device 1000, in response to the detection of an input applied to the first sub icon. The control circuit 510 also pauses/resumes the transmission of the first audio data to the external device, in response to the detection of an input applied to the second sub icon. Therefore, the user of the electronic device 500 may selectively transmit or pause the transmission of the first video and the first audio data, separately and independently, to the external device 1000.

The first sub icon may vary in type according to a condition as to whether to transmit the first video or to pause the transmission of the first video, and the second sub icon may vary in type according to a condition as to whether to transmit the first audio data or to pause the transmission of the first audio data. The first sub icon and the second sub icon will be described in detail with reference to FIG. 8F.

Figure 6A:
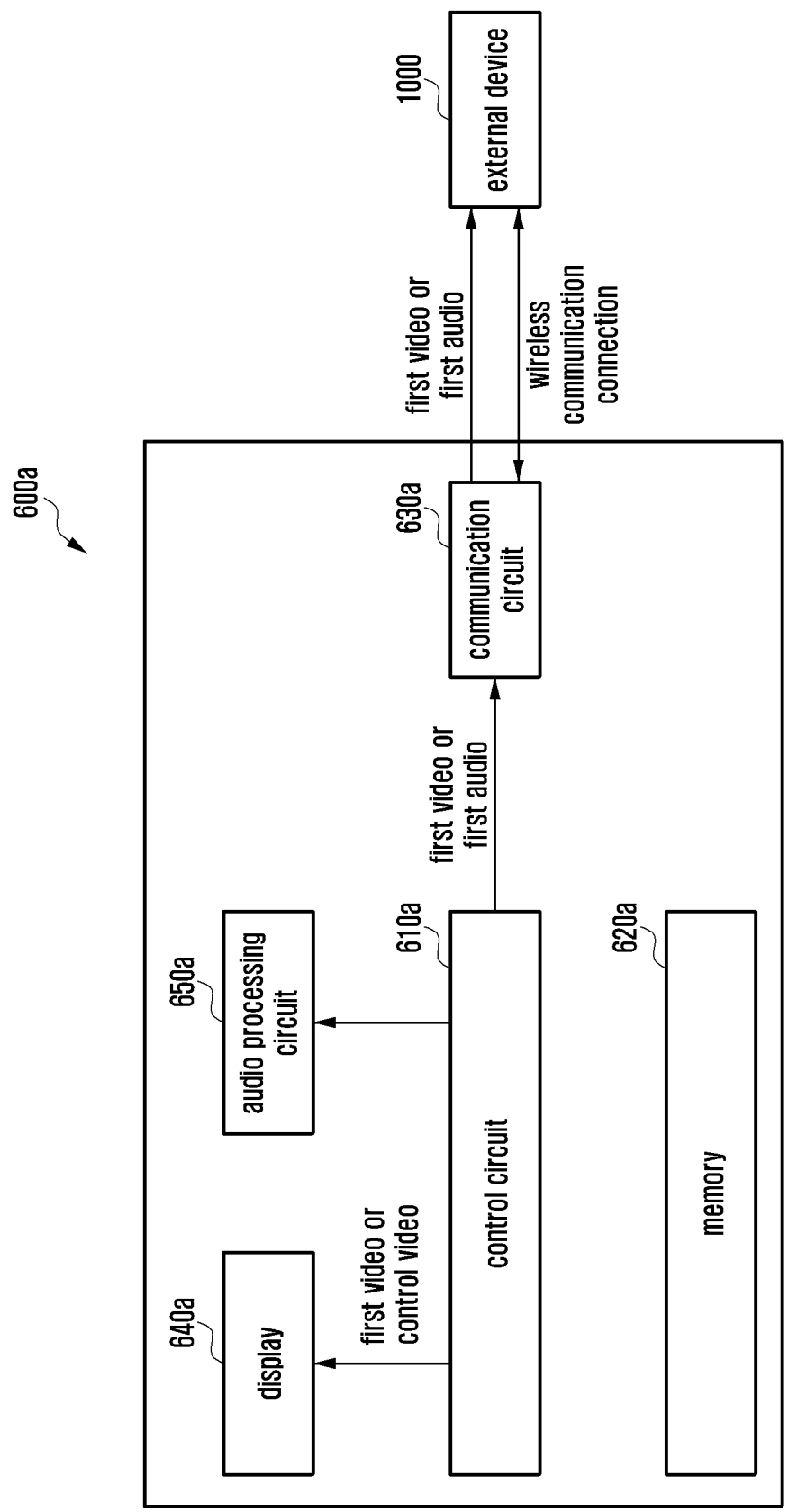
FIGS. 6A and 6B are block diagrams illustrating data flow between an electronic device and an external device in a first mode and a second mode, when a video sharing function is executed, according to an embodiment of the present disclosure.
Figure 6B:
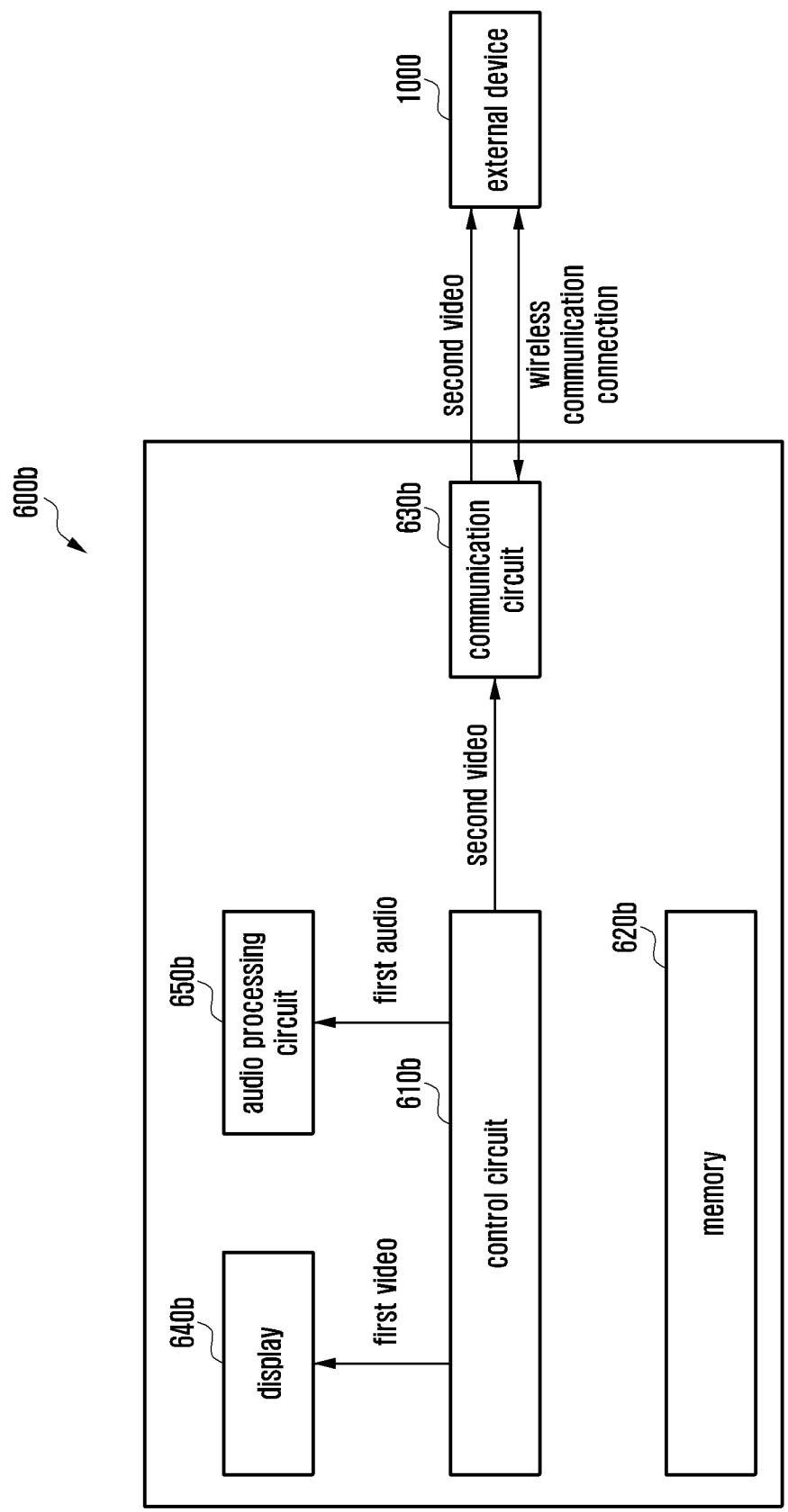

FIGS. 6A and 6B are block diagrams illustrating data flow between an electronic device and an external device in a first mode and a second mode, when a video sharing function is executed, according to an embodiment of the present disclosure.

Referring to FIG. 6A an electronic device 600a and the external device 1000, in a first mode when the video sharing function is executed, is provided, i.e., when the electronic device 600a transmits a first video to the external device 1000.

The electronic device 600a includes a control circuit 610a, a memory 620a, a communication circuit 630a, a display 640a, and an audio processing circuit 650a. When the video sharing function is executed, the control circuit 610a establishes a wireless communication connection with the external device 1000, operates in a first mode, and transmits a first video to the external device 1000. More specifically, the control circuit 610a synchronizes a first video with first audio data corresponding to the first video and transfers the first video and the first audio data to the communication circuit 630a. The communication circuit 630a transmits the first video and the first audio data to the external device 1000.

When the first video is transmitted, simultaneously or at any other time, the control circuit 610a displays the first video or a control video for controlling playback of the first video on the display 640a. The first mode may be set in such a way that an audio signal is not output via the audio processing circuit 650a of the electronic device 600a, but first audio data is output via the external device 1000.

Although FIG. 6A illustrates a method by which both the first video and the first audio data are transmitted to the external device 1000, the control circuit 610a may pause the transmission of the first video or the first audio data according to a user's selection of an icon. In this case, the icon may include a first sub icon related to the transmission of a first video and a second sub icon related to the transmission of first audio data.

Referring to FIG. 6B an electronic device 600b and the external device 1000, in a second mode when the video sharing function is executed, is provided, i.e., when the electronic device 600b pauses the transmission of a first video to the external device 1000.

The electronic device 600b includes a control circuit 610b, a memory 620b, a communication circuit 630b, a display 640b, and an audio processing circuit 650b. The control circuit 610b changes the video sharing function from a first mode to a second mode in response to detection of a first input. In the second mode, the control circuit 610b transfers a second video, corresponding to a freeze screen, to the communication circuit 620b, and the communication circuit 620b transmits the second video to the external device 1000. In this case, the control circuit 610b controls the communication circuit 620b to transmit the second video to the external device 1000 periodically (e.g., every one minute or five minutes) or once when the mode is changed to a second mode. In the second mode pausing the transmission of the first video, the wireless communication connection between the communication circuit 620b and the external device 1000 may be maintained.

The control circuit 610b displays the first video on the display 640b simultaneously when pausing the transmission of the first video to the external device 1000. The control circuit 610b transfers first audio data to the audio processing circuit 650b, thereby enabling the audio processing circuit 650b to output the first audio data to a speaker built in the electronic device 600b or to earphones (or an external speaker) connected in wired/wireless mode to the electronic device 600b.

When the control circuit 610b detects a second input applied to an icon, the control circuit 610b changes the mode to the first mode and resumes transmitting the first video and the first audio data, as described with respect to FIG. 6A.

Figure 7A:
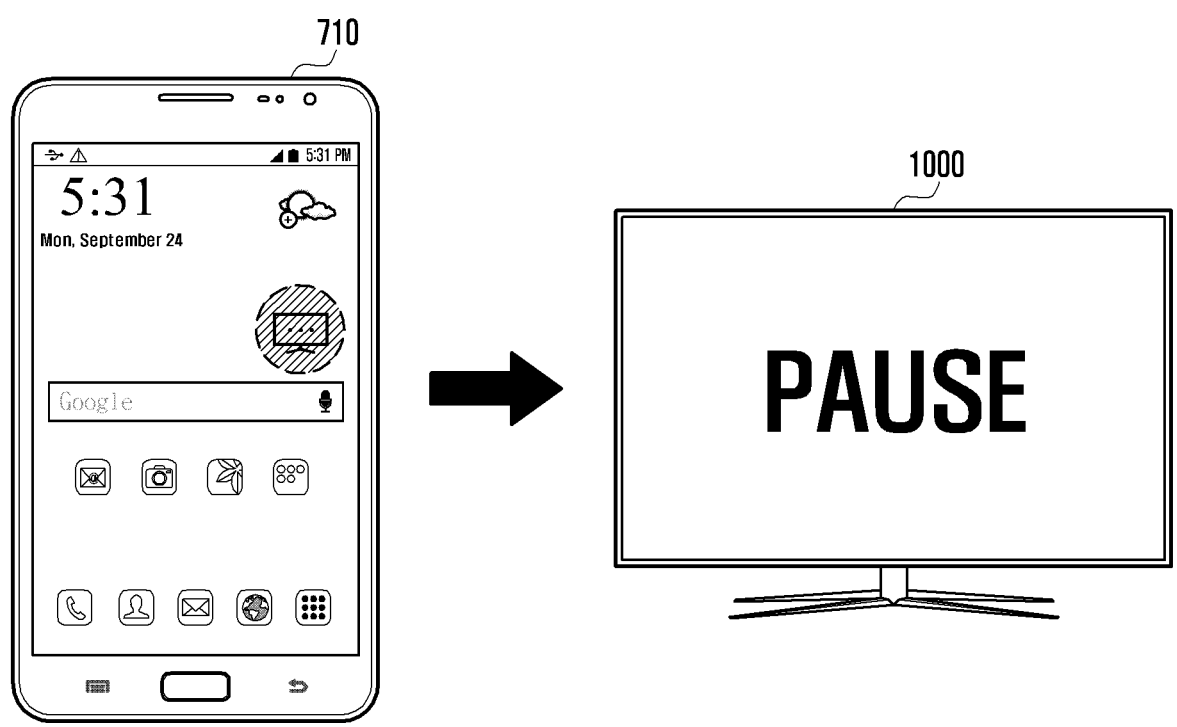
FIGS. 7A and 7B illustrate screens of an electronic device and an external device, when pausing video sharing, according to an embodiment of the present disclosure.
Figure 7B:
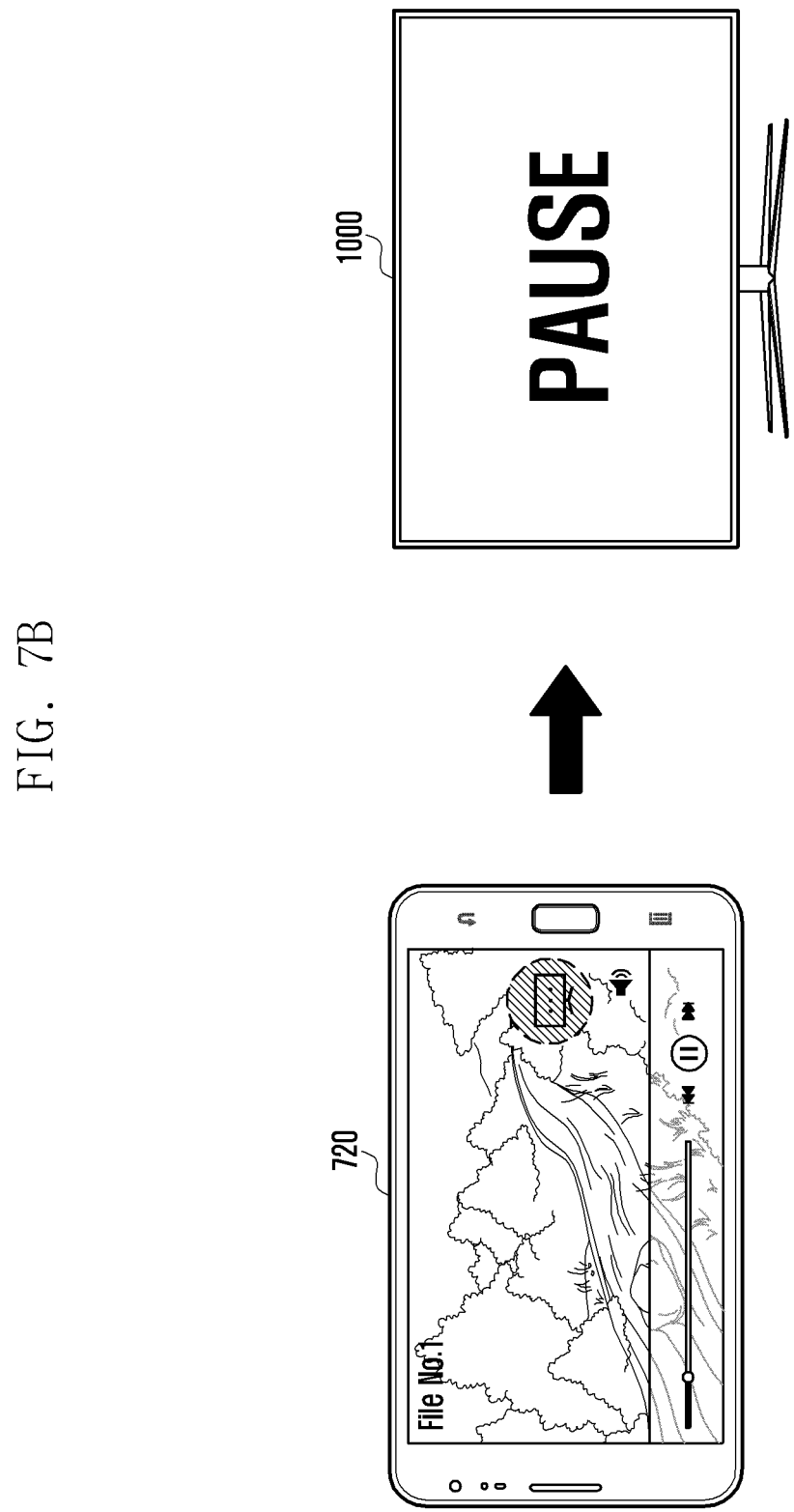

FIGS. 7A and 7B illustrate screens of an electronic device and an external device, when pausing video sharing, according to an embodiment of the present disclosure.

Referring to FIG. 7A, an electronic device 710 and the external device 1000 are provided. When a first video is the same as that displayed on the display screen of the electronic device 710 (e.g., a home screen), both the displays of the electronic device 710 and the external device 1000 display the same first video in a first mode, as described with respect to FIG. 4A. In this case, the electronic device 710 further displays an icon for changing the mode of the video sharing function according to the execution of the video sharing function. The icon may be displayed on a separate layer that differs from the first video, and thus may not be displayed on the display screen of the external device 1000. In this case, the icon may be displayed in a form corresponding to the first mode.

When the electronic device 710 detects a first input, it transmits a second video to the external device 1000, while displaying the first video on the display screen of the electronic device 710. That is, while the electronic device 710 displays the first video on the display screen, the external device 1000 displays a second video representing that the transmission of a video is paused. The second video may be a still image containing text, e.g., the 'PAUSE' image shown in FIGS. 7A and 7B, but is not limited thereto.

Referring to FIG. 7B, an electronic device 720 and the external device 1000 is provided. When the first video is a content video, the electronic device 720 transmits the first video to the external device 1000, as shown in FIG. 4B, and displays a control video for controlling the first video on the display screen of the electronic device 720. In this case, the electronic device 720 is creates an icon on a separate layer that differs from the control video, and displays the icon on the display screen of the electronic device 720.

When the electronic device 720 detects a first input, the electronic device 720 transmits a second video to the external device 1000 and displays the first video on the display screen of the electronic device 720. In this case, the icon may vary in type according to the change to the second mode. The control video may be displayed on a layer higher than that displaying the first video. When the electronic device 720 has not detected an input for a preset period of time, the electronic device 720 displays the first video and the icon without displaying the control video. Simultaneously or at any other time, the external device 1000 displays a second video representing pausing the transmission of a video.

FIGS. 8A to 8F illustrate screens of an electronic device and an external device, when the electronic device executes a video sharing function, pauses video sharing, and resumes the video sharing, according to an embodiment of the present disclosure.

Figure 8A:
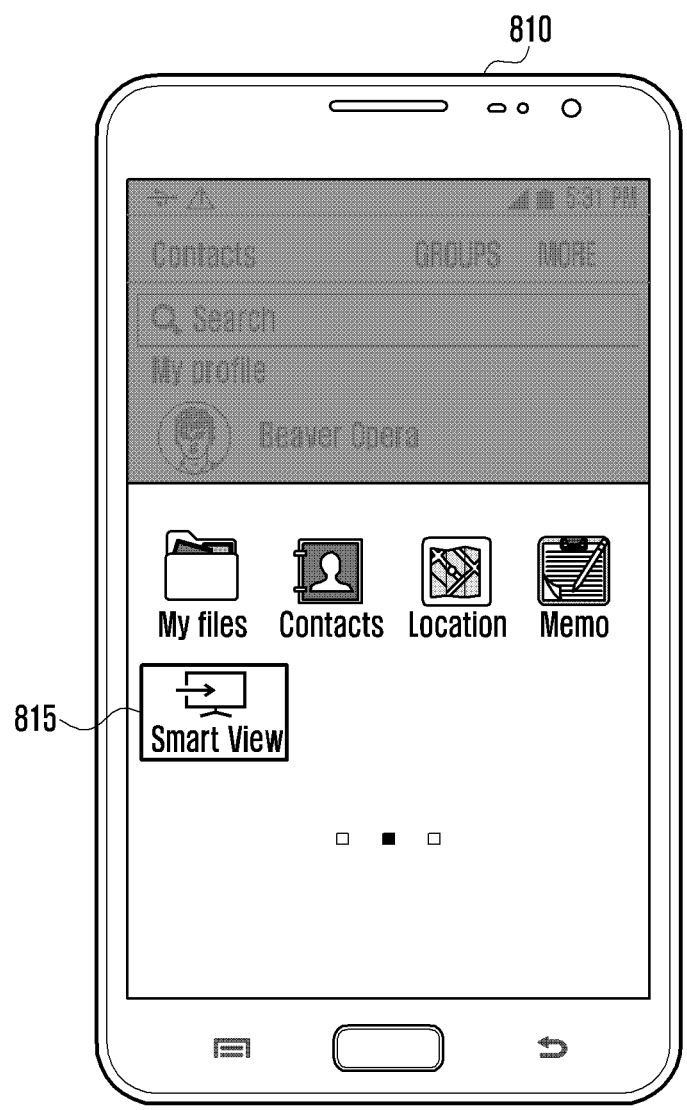
FIGS. 8A to 8F illustrate screens of an electronic device and an external device, when the electronic device executes a video sharing function, pauses video sharing, and resumes the video sharing, according to an embodiment of the present disclosure.

Referring to FIG. 8A, a screen for executing a video sharing function in an electronic device 810 is provided.

The electronic device 810 displays a contact list containing details of a number of users on the display screen of the electronic device 810, based on a user input. When the electronic device 810 detects a user input (e.g., long touch input) applied to one of the contacts on the contact list, it displays a menu list related to the selected contact, as shown in FIG. 8A. The menu list may contain a menu icon 815 for executing a video sharing function. When the menu icon 815 is selected (touched/activated by a use input), the electronic device 810 establishes a wireless communication connection with an external device 1000 of the selected contact to share a video with the external device 1000.

Figure 8B:
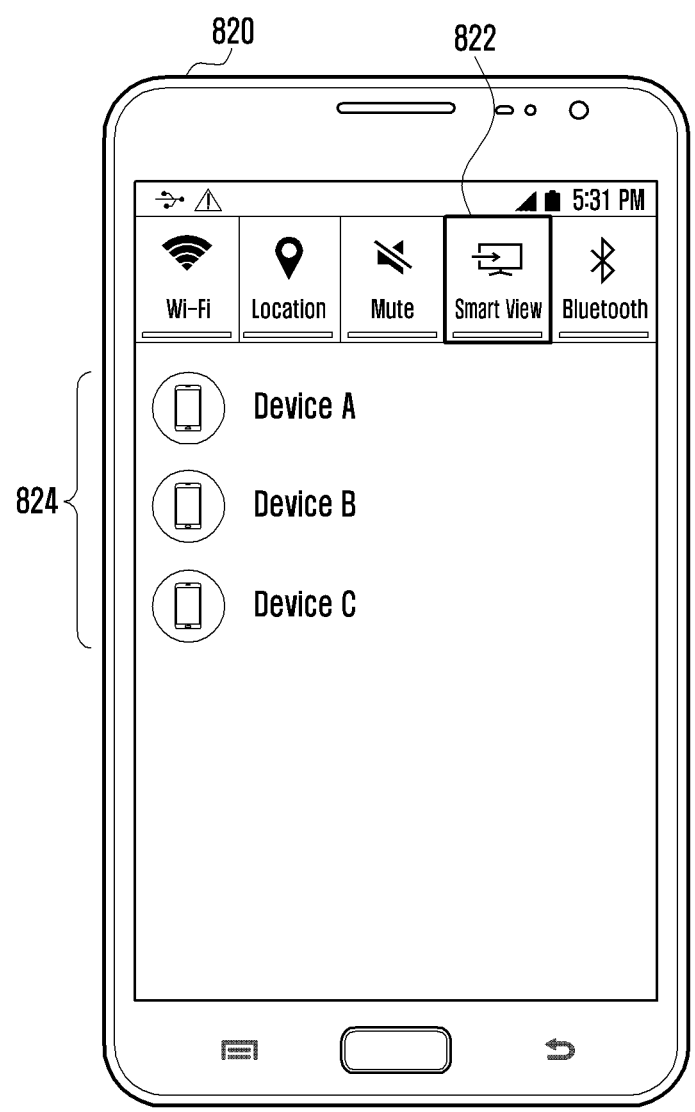

Referring to FIG. 8B, a screen for executing the video sharing function in an electronic device 820 is provided. The electronic device 820 displays a menu list on the top of a home screen. The menu list may contain a menu icon 822 for executing a video sharing function. When the menu icon 822 is selected (touched/activated by a use input), the electronic device 820 displays a list 824 of connectable external devices. The external device list 824 is displayed with information regarding external devices connectable to the electronic device 820, e.g., external device names, icons corresponding to types of electronic devices, etc. When a user input is applied to one of the external devices on the external device list 824, the electronic device 820 establishes a wireless communication connection with the selected external device to share a video with the external device.

Figure 8C:
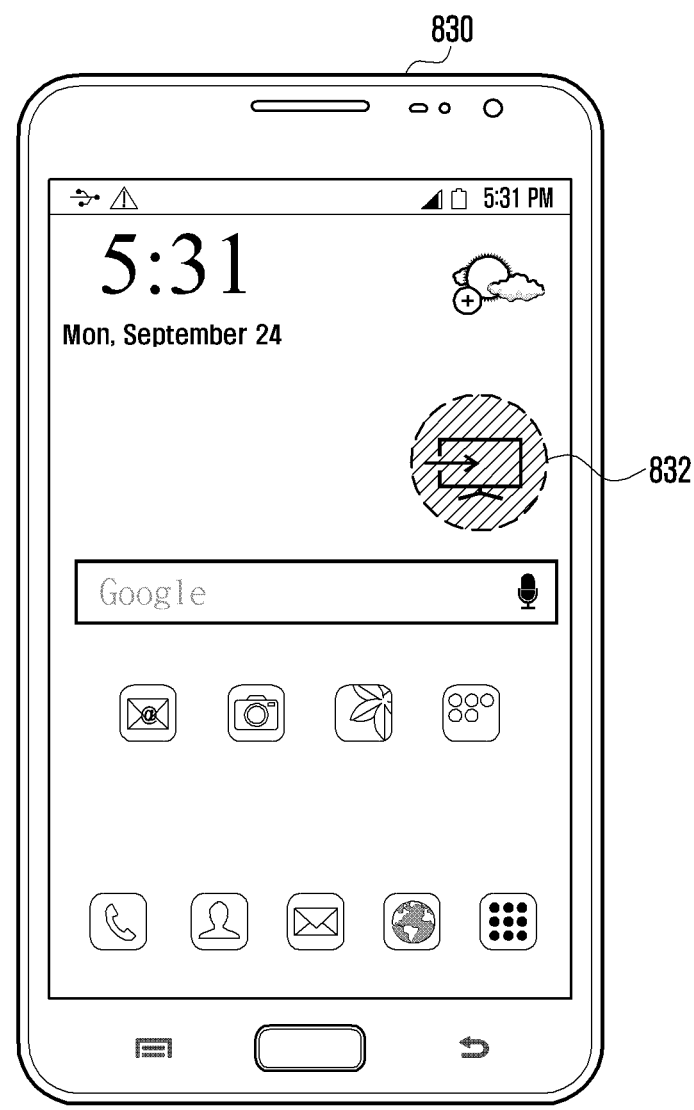

Referring to FIG. 8C, a screen of an electronic device 830 in a first mode of the video sharing function is provided. The electronic device 830 transmits a first video to the external device 1000 in a first mode, and simultaneously or at any other time, displays the first video on a display screen of the external device 1000. When the electronic device 830 displays the first video on the display screen of the external device 1000, simultaneously or at any other time, the electronic device 830 displays an icon 832 on the display screen of the electronic device 830 for changing the mode of the video sharing function. The icon 832 displayed in a first mode may have a form to show that the first video is being transmitted to the external device 1000, but is not limited to the form shown in FIG. 8C. The icon 832 is displayed on the display screen of the electronic device 830 and may not be displayed on the display screen of the external device 1000.

Figure 8D:
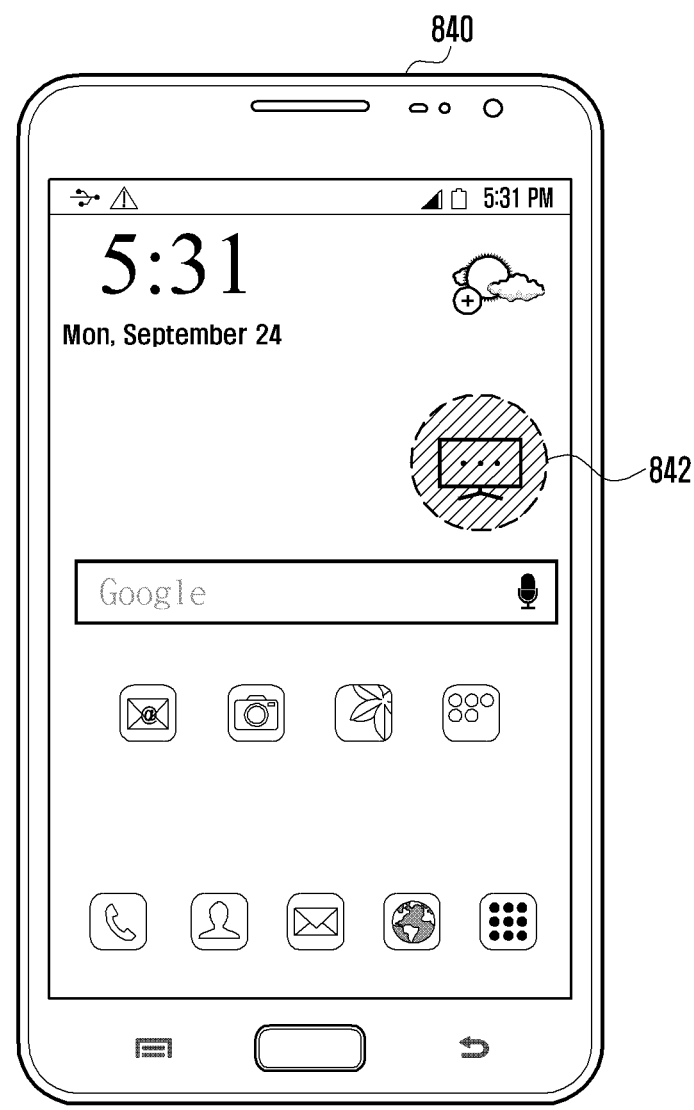

Referring to FIG. 8D, a screen of an electronic device 840 in a second mode of the video sharing function is provided.

The electronic device 840 pauses the transmission of a first video to the external device 1000 in response to the detection of a first input (e.g., a touch input or a hovering input) applied to the icon 832, shown in FIG. 8C, displayed in the first mode. In this case, the electronic device 840 still displays the first video on the display screen of the electronic device 840. The icon 832 is changed to an icon 842 as the mode is changed to a second mode, as shown in FIG. 8D. The icon 842 displayed in the second mode may have a form to show a state of pausing the transmission of the first video to the external device 1000, but is not limited to the form shown in FIG. 8D. The icon 842 is displayed on the display screen of the electronic device 840 and may not be displayed on the display screen of the external device 1000.

Figure 8E:
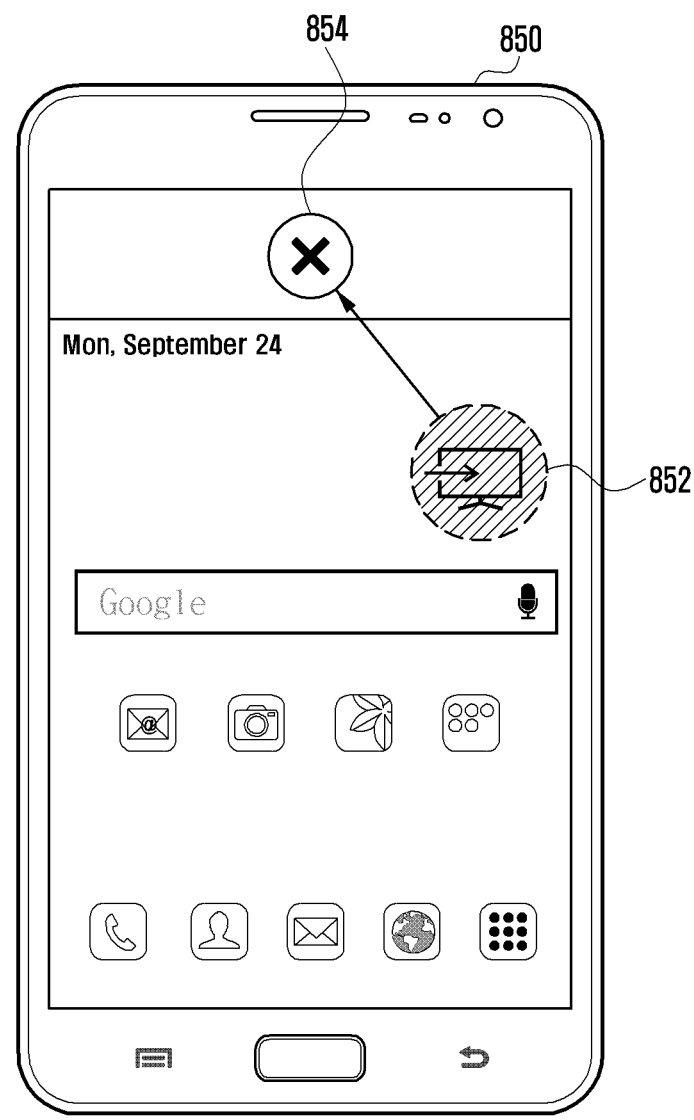

Referring to FIG. 8E, a screen of an electronic device 850 having released the wireless communication connection with the external device 1000 is provided.

The electronic device 850 releases the wireless communication connection with the external device 1000, in response to the detection of a third input applied to an icon 852. For example, when the electronic device 850 detects a long touch input applied to the icon 852, an area 854 for removing icons is displayed on the top of the display screen of the electronic device 850. When the user drags and drops the icon 852 in the area 854, the electronic device 850 considers the user input to be a third input.

When the electronic device 850 detects the third input, the wireless communication connection with the external device 1000 is released. In this case, the electronic device 850 pauses the transmission of the first video and the second video to the external device 1000 and removes the displayed icon 854. When the electronic device 850 releases the wireless communication connection with the external device 1000, the first video remains displayed on the display screen of the electronic device 850.

Although FIG. 8E illustrates a method in which the electronic device 850 releases the wireless communication connection with the external device 1000 during the transmission of the first video, the electronic device 850 may also release the wireless communication connection with the external device 1000 in a state of pausing the transmission of the first video, as shown in FIG. 8D. That is, while the electronic device 850 displays an icon 842 showing a state of pausing the transmission of the first video, as shown in FIG. 8D, when the icon 842 is dragged and dropped in the area 854, shown in FIG. 8E, the electronic device 850 releases the wireless communication connection with the external device 100.

The icons shown in FIGS. 8C to 8E are provided for a better understanding the present disclosure, and the icons may be implemented in various forms. For example, when an icon is long touched, the electronic device may display a list of menus for pausing the transmission of a first video, resuming transmission of the first video, releasing the connection with an external device, etc. In this case, when one of the menus on the list is selected, the electronic device performs a function corresponding to the selected menu. Alternatively, the electronic device may display, on the display screen, a number of icons corresponding to each of the functions for pausing the transmission of a first video, resuming transmission of the first video, releasing the connection with an external device, etc.

Figure 8F:
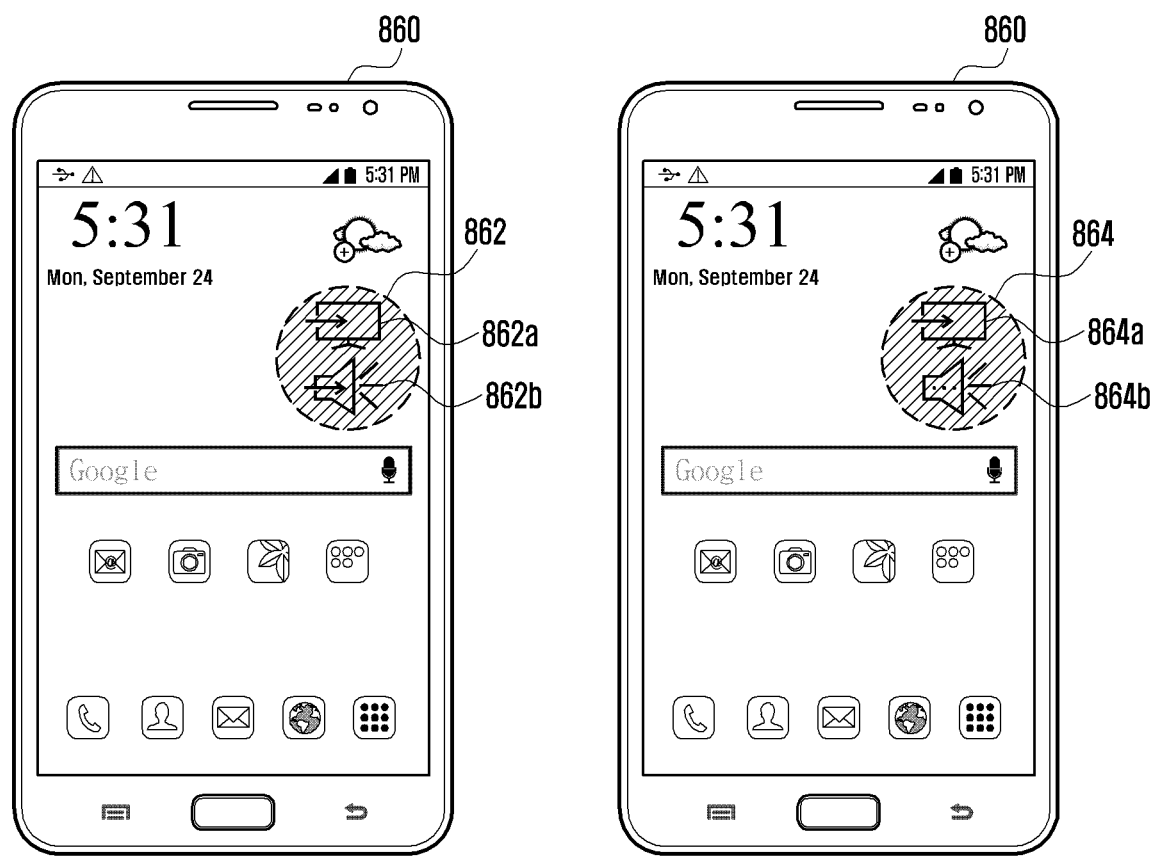

Referring to FIG. 8F, an electronic device 860 displaying an icon 862 is provided. The icon 862 is implemented to include a first sub icon 862a related to the transmission of a first video and a second sub icon 862b related to the transmission of first audio data. In this case, the first sub icon 862a and the second sub icon 862b may be implemented with a toggle button, respectively.

When the electronic device 860 transmits the first video and the first audio data to the external device 1000 according to the execution of the video sharing function, the first sub icon 862a may be displayed in a form corresponding to the transmission of the first video and the second sub icon 862b may be displayed in a form corresponding to the transmission of first audio data.

When the electronic device 860 receives a user's first input (e.g., a touch input or a hovering input) applied to the first sub icon 862a, the transmission of the first video is paused and the form of the first sub icon 862a is changed to a form 864a showing a state of pausing the transmission of the first video. In addition, when the electronic device 860 receives a user's first input (e.g., a touch input or a hovering input) applied to the second sub icon 862b, the transmission of the first audio data is paused and the form of the second sub icon 862b is changed to a form 864b showing a state of pausing the transmission of the first audio data.

Therefore, the user of the electronic device 860 may selectively and independently transmit or pause transmission of the first video and the first audio data to the external device 1000.

In various embodiments, an electronic device is configured to include: a display; a communication circuit; a control circuit electrically connected to the display and the communication circuit; and a memory electrically connected to the control circuit. The memory stores instructions enabling the control circuit to: control the communication circuit to transmit a first video to an external device wirelessly connected to the electronic device, according to the execution of a video sharing function: display an icon on part of the display, simultaneously or at any other time, when transmitting the first video; and control the communication circuit to pause the transmission of the first video and to transmit a second video that differs from the first video to the external device, in response to the detection of a first input applied to the displayed icon.

The second video may be a video corresponding to a freeze screen.

The control circuit controls the communication circuit to transmit the second video to the external device at a preset period.

The control circuit controls the display to display the first video when transmitting the second video to the external device.

The first video is a content video and the control circuit displays a control video for controlling the output of the first video to the display, simultaneously or at any other time, when the first video is transmitted to the external device.

The control circuit controls the display to stop displaying the control video and to display the first video, in response to the detection of a second input.

The control circuit controls the communication circuit to resume the transmission of the first video, in response to the detection of a second input applied to the icon.

The control circuit releases the wireless communication connection between the communication circuit and the external device, in response to the detection of a third input applied to the icon.

The icon includes a toggle button for altering the video sharing function from a first mode to a second mode according to the first input and from the second mode to the first mode according to the second input.

The icon is displayed on a layer on the display screen, which differs from a layer displaying the first video.

The first input and the second input are the same type of input.

The control circuit controls the communication circuit to transmit the first video along with first audio data corresponding to the first video to the external device and to pause the transmission of the first video and the first audio data, in response to the detection of the first input.

The electronic device may further include an audio processing circuit for processing and outputting audio signals. The control circuit transfers the first audio data to the audio processing circuit in response to the detection of the first input.

Figure 9:
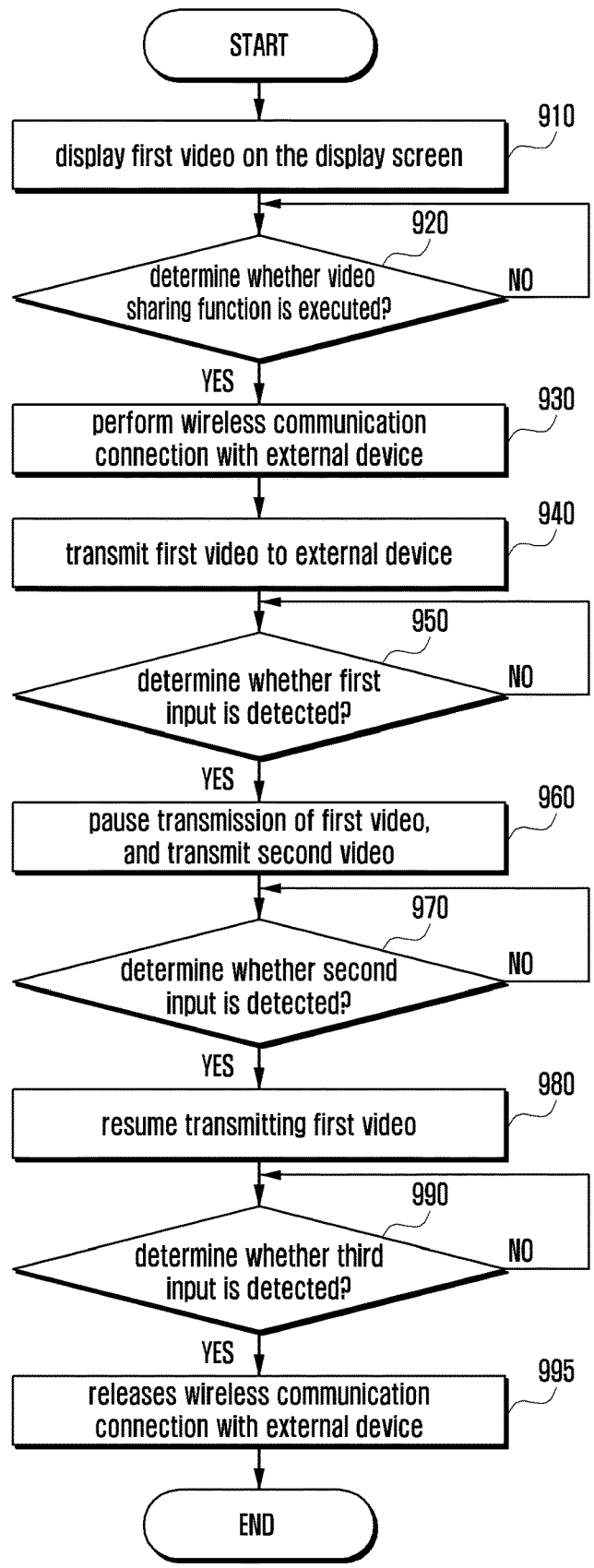
FIG. 9 is a flowchart of a method for controlling video sharing in an electronic device, according to an embodiment of the present disclosure.

FIG. 9 is a flowchart of a method for controlling video sharing in an electronic device, according to an embodiment of the present disclosure In step 910, the electronic device displays a first video on the display screen of the electronic device. The first video may be a graphic user interface (GUI) created according to the operations of the electronic device, e.g., a home screen, a screen created according to the execution of applications, a content video stored in the memory of the electronic device or received from external systems, etc.

In step 920, the electronic device determines whether an input for executing a video sharing function is received. If the electronic device detects the input for executing the video sharing function, in step 930, the electronic device establishes a wireless communication connection with an external device. If the electronic device does not detect the input for executing the video sharing function, the electronic device returns to step 920.

In step 940, the electronic device transmits the first video to the external device. When the first video is the same video (e.g., a home screen) as that displayed on the display screen of the electronic device, the electronic device displays the first video on the display screen of the electronic device, simultaneously or at any other time, when the first video is transmitted to the external device. When the first video is a content video, the electronic device transmits the first video to the external device, and displays a control video for controlling the first video on the display screen of the electronic device.

The electronic device displays an icon on the display screen of the electronic device, simultaneously or at any other time when transmitting the first video to the external device. The icon is for pausing the execution of the video sharing function, resuming the transmission of the video, or releasing the connection with the external device. The icon may be displayed on a different layer than a layer displaying the first video, and thus may not be displayed on the display screen of the external device when the video is transmitted to the external device.

The electronic device may additionally transmit first audio data corresponding to the first video to the external device. In stem 950, the electronic device determines whether a first input applied to the displayed icon during the transmission of the first video is detected.

When the first input is detected, in step 960, the electronic device pauses the transmission of the first video and transmits a second video, which differs from the first video, to the external device. The electronic device performs the transmission of the second video to the external device at a preset period or periodically (e.g., every one minute or five minutes), or once when a first or third mode is changed to a second mode. In this case, the external device pauses the display of the first video on the display screen of the external device, and displays a second video corresponding to a freeze screen. In the second mode pausing the transmission of a first video, the wireless communication connection between the electronic device and the external device may be maintained.

The electronic device pauses the transmission of a first video to the external device, and simultaneously displays the first video on the display screen of the electronic device. The electronic device outputs first audio data to a built-in speaker or to earphones (or an external speaker) connected to the electronic device. The electronic device changes the form of the displayed icon to a form corresponding to the second mode in response to the detection of a first input.

When the first input is not detected, the electronic device returns to step 950. In step 970, the electronic device determines whether a second input applied to the displayed icon is detected. The second input may be the same type as the first input, e.g., a touch input or a hovering input.

When the second input is detected, in step 980, the electronic device resumes the transmission of the first video. That is, the electronic device performs the same operation as performed in step 940.

When the second input is not detected, the electronic device returns to step 970.

In step 990, the electronic device determines whether a third input applied to the displayed icon is detected. The third input differs in type from the first input and the second input. Although step 990 is described as being performed while the electronic device is in the second mode, i.e., after step 980, step 990 may alternatively be performed while the electronic device is in the first mode, i.e., after step 940.

When the third input is detected, in step 995, the electronic device releases the wireless communication connection with the external device.

When the third input is not detected, the electronic device returns to step 990.

In various embodiments, a method of controlling the sharing of videos via an electronic device is implemented to include transmitting a first video to an external device wirelessly connected to the electronic device, according to the execution of a video sharing function; displaying an icon on part of a display, simultaneously or at any other time, when transmitting the first video; and pausing the transmission of the first video, and transmitting a second video that differs from the first video to the external device, in response to the detection of a first input applied to the displayed icon.

The second video may be a video corresponding to a freeze screen.

The transmission of the second video includes transmitting the second video to the external device at a preset period The first video is a content video. The method further includes displaying a control video for controlling the output of the first video to the display, simultaneously or at any other time, when the first video is transmitted to the external device.

The method further includes stopping the display of the control video on the display screen, and displaying the first video, in response to the detection of a second input.

The method further includes resuming the transmission of the first video, in response to the detection of a second input applied to the icon.

The transmission of a first video to an external device includes: transmitting the first video along with first audio data corresponding to the first video to the external device; and pausing the transmission of the first video and the first audio data, in response to the detection of the first input, and outputting the first audio data via the electronic device.

While the present disclosure has been described with reference to various embodiments, it will be understood by those skilled in the art that various changes in form and detail may be made without departing from the spirit and scope of the present disclosure, which is defined, not by the detailed description and embodiments, but by the appended claims and their equivalents.

What is claimed is:

1. An electronic device comprising:
   a display;
   a communication circuit;
   a memory configured to store a video; and
   at least one processor configured to:
      display first content of the video on the display;
      based on a determination that a sharing function is selected by a user, perform the sharing function by:
         establishing, via the communication circuit, a wireless connection between the electronic device and an external device,
         ceasing display of the video on the display,
         displaying, on the display, a control video for controlling playback of second content of the video on a display of the external device, wherein, without displaying the video content, the control video is configured to display a control user interface for controlling playback or pausing of the video content, a name of the video content, and an icon for controlling the sharing function on the display of the electronic device, the second content being a continuation of the first content of the video, wherein the icon is displayed on an upper layer over the control user interface, and the icon is movable within the display based on a touch input, and
         transmitting, via the wireless connection, the second content of the video to the external device without transmitting data associated with the icon such that the second content without the icon is displayed on the external device while the control video, without displaying the second content, is displayed on the display of the electronic device; and
      based on a first user interaction involving the icon, control the sharing function by:
         ceasing transmission of the second content to the external device, periodically transmitting at a preset interval, via the wireless connection, an image indicating a transmission status to the external device for display on the display of the external device in order to maintain the wireless connection, wherein the wireless connection is released at a time in case of periodic transmissions of the image, from the electronic device to the external device, ceasing for a preset period of time; and displaying, on the display of the electronic device, the control video while displaying third content of the video with the icon, the third content being a continuation of the second content, wherein the icon is displayed on the upper layer over the third content of the video, and the icon is movable within the display based on the touch input.

2. The electronic device of claim 1, wherein the image indicating the transmission status comprises an image corresponding to pausing a transmission.

3. The electronic device of claim 1, wherein the at least one processor is further configured to, in response to a second user interaction involving the icon, transmit fourth content of the video to the external device, and display, on the display of the electronic device, the control user interface with the icon, the fourth content being a continuation of the third content.

4. The electronic device of claim 1, wherein the icon is only displayed on the screen of the electronic device.

5. The electronic device of claim 1, wherein the icon comprises a toggle button for changing the sharing function from a first mode to a second mode, in response to a user input on the icon.

6. The electronic device of claim 1, wherein the at least one processor is further configured to:
transmit audio data corresponding to the second content together with the second content to the external device; and
cease the transmission of the audio data with the second content, in response to the first user interaction involving the icon.

7. The electronic device of claim 6, further comprising:
an audio processing circuit for processing and outputting audio signals,
wherein the at least one processor is further configured to transfer the audio data to the audio processing circuit, in response to the first user interaction involving the icon.

8. The electronic device of claim 1, wherein the at least one processor is further configured to:
upon completion of the video, display, on the display of the external device, a current screen of the display of the electronic device.

9. The electronic device of claim 1, wherein the wireless connection between the electronic device and the external device is maintained while ceasing transmission of the second content.

10. A method of an electronic device for controlling image sharing comprising:
displaying first content of a video on a display of the electronic device;
based on a determination that a sharing function is selected by a user, performing the sharing function by:
establishing a wireless connection between the electronic device and an external device,
ceasing display of the video on the display,
displaying, on the display, a control video for controlling playback of second content of the video on a display of the external device, wherein, without displaying the video content, the control video is configured to display a control user interface for controlling playback or pausing of the video content, a name of the video content and an icon for controlling the sharing function on the display of the electronic device, the second content being a continuation of the first content of the video, wherein the icon is displayed on an upper layer over the control user interface, and the icon is movable within the display based on a touch input, and
transmitting, via the wireless connection, the second content of the video to the external device without transmitting data associated with the icon such that the second content without the icon is displayed on the external device while the control video, without displaying the second content, is displayed on the display of the electronic device; and
based on a first user interaction involving the icon, controlling the sharing function by:
ceasing transmission of the second content to the external device,
periodically transmitting at a preset interval, via the wireless connection, an image indicating a transmission status to the external device for display on the display of the external device in order to maintain the wireless connection, wherein the wireless connection is released at a time in case of periodic transmissions of the image, from the electronic device to the external device, ceasing for a preset period of time, and
displaying, on the display of the electronic device, the control video while displaying third content of the video with the icon, the third content being a continuation of the second content, wherein the icon is displayed on the upper layer over the third content of the video, and the icon is movable within the display based on the touch input.

11. The method of claim 10, wherein the image indicating the transmission status comprises an image corresponding to a pause in transmission.

12. The method of claim 10, further comprising:
in response to a second user interaction involving the icon, transmitting fourth content of the video to the external device, and displaying the control user interface on the display with the icon, the fourth content being a continuation of the third content.

13. The method of claim 10, wherein the icon is only displayed on the display.

14. The method of claim 10, wherein transmitting the second content to the external device comprises:
transmitting the second content together with first audio data corresponding to the second content to the external device.

15. The method of claim 10, further comprising:
upon completion of the video, displaying, on the display of the external device, a current screen of the display of the electronic device.

* * * * *